(12) United States Patent
Sanders et al.

(10) Patent No.: US 11,516,015 B2
(45) Date of Patent: Nov. 29, 2022

(54) SYSTEM AND METHOD FOR COMPUTING CLUSTER SEEDING AND SECURITY USING KUBERNETES IMMUTABLE RESOURCE LOG

(71) Applicant: Dell Products, LP, Round Rock, TX (US)

(72) Inventors: Douglas Sanders, Coppell, TX (US); Marc Jimenez, Richardson, TX (US); Robert Jackson, Wylie, TX (US); Aaron Kitchens, Dallas, TX (US)

(73) Assignee: Dell Products, LP, Round Rock, TX (US)

( * ) Notice: Subject to any disclaimer, the term of this patent is extended or adjusted under 35 U.S.C. 154(b) by 56 days.

(21) Appl. No.: 17/232,958

(22) Filed: Apr. 16, 2021

(65) Prior Publication Data
US 2022/0337417 A1     Oct. 20, 2022

(51) Int. Cl.
*G06F 15/16* (2006.01)
*H04L 9/32* (2006.01)
*H04L 9/06* (2006.01)
*H04L 67/1097* (2022.01)
*H04L 67/00* (2022.01)
*H04L 67/06* (2022.01)
*H04L 9/08* (2006.01)

(52) U.S. Cl.
CPC .......... *H04L 9/3226* (2013.01); *H04L 9/0643* (2013.01); *H04L 9/0819* (2013.01); *H04L 67/06* (2013.01); *H04L 67/1097* (2013.01); *H04L 67/34* (2013.01)

(58) Field of Classification Search
CPC ... H04L 9/0643; H04L 9/0819; H04L 9/3226; H04L 67/06; H04L 67/34; H04L 67/1097
USPC .......................................................... 726/4
See application file for complete search history.

(56) References Cited

U.S. PATENT DOCUMENTS

| | | | |
|---|---|---|---|
| 7,496,911 B2 | 2/2009 | Rowley |
| 9,521,115 B1 | 12/2016 | Woolward |
| 10,353,726 B2 | 7/2019 | Duan |
| 10,503,623 B2 | 12/2019 | Keller |
| 2005/0204354 A1 | 9/2005 | Sundararajan |
| 2017/0116415 A1 | 4/2017 | Stopel |
| 2019/0156023 A1 | 5/2019 | Gerebe |

*Primary Examiner* — Yves Dalencourt
(74) *Attorney, Agent, or Firm* — Prol Intellectual Property Law, PLLC; H. Kenneth Prol

(57) ABSTRACT

A method of reporting differences between a plurality of computing cluster configurations for executing containerized software applications may comprise routinely retrieving, at preset time intervals, cluster configuration files stored at computing clusters for configuring the computing clusters for execution of a containerized software application, receiving a user selection of a first cluster configuration file and a second cluster configuration file within the stored cluster configuration files, and comparing the first cluster configuration file and the second cluster configuration file. The method may also include displaying a difference between the first cluster configuration file and the second cluster configuration file resulting in the first cluster configuration file configuring one or more computing clusters for execution of the containerized software application differently than the second cluster configuration file configures one or more computing clusters for execution of the containerized software application.

20 Claims, 9 Drawing Sheets

SYSTEM AND METHOD FOR COMPUTING CLUSTER SEEDING AND SECURITY USING KUBERNETES IMMUTABLE RESOURCE LOG

FIELD OF THE DISCLOSURE

The present disclosure generally relates to deployment of containerized software applications to one or more computing nodes. More specifically, the present disclosure relates to managing configuration of computing nodes executing containerized software applications.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may conduct one or more forms of wireless network communication for deployment of and execution of containerized software.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
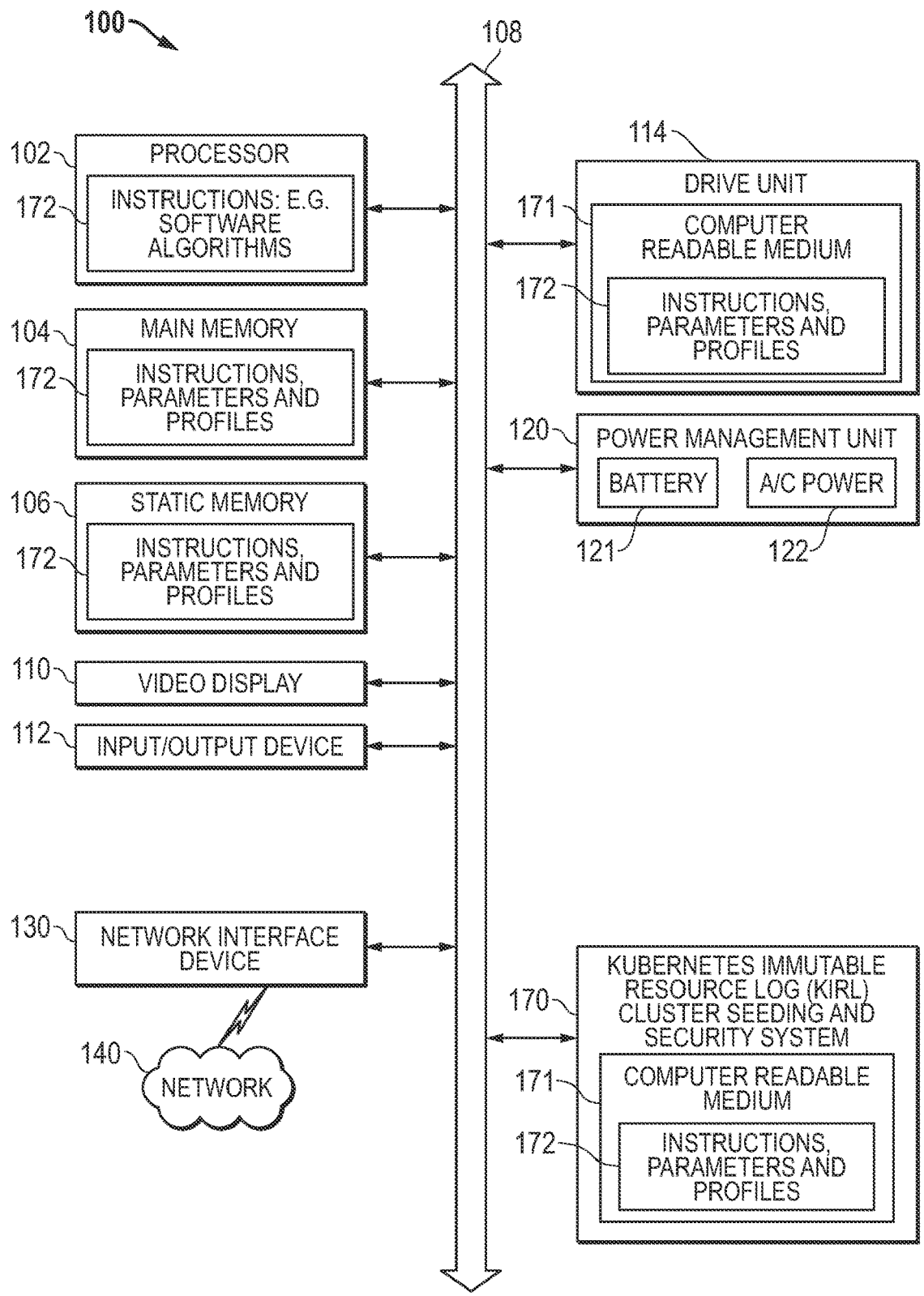
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Traditionally, software applications executing at a given computing device needed to be configured to run within the computing environment hosted at the given computing device. This resulted in a tailored configuration for each instance of the same software application running on each of several different computing devices. With the advent of cloud computing, a need arose to easily and quickly deploy the same software application across several different computing devices, called nodes, within a computing cluster containing several such nodes. In order to avoid reconfiguring each software application for each specific node at the time of deployment, the cloud computing industry moved toward a software containerization model that allows each instance of the software application to run uniformly and consistently within any node computing environment.

The software application containerization method separates node configuration instructions from the code instructions for executing the underlying containerized software application. This allows users to deploy the underlying containerized software application to any computing cluster by instructing a master node at that cluster to configure the cluster using an abstracted cluster configuration file. Once configured, the cluster may then execute the underlying containerized software application via a runtime engine operating to access and execute various portions of the underlying containerized software application stored at the computing cluster as an immutable or unchangeable memory image within a "container" operating separate and apart from the operating system (OS) of the cluster or its nodes. Storing the containerized software application image in such a way may inhibit any inadvertent changes made to the underlying software application code instructions during configuration of the cluster. This method may ensure that any bugs or errors resulting from deployment of the containerized software application at a given cluster are caused by the configuration of the cluster, rather than execution of the underlying software application code instructions themselves. Thus, in order to remedy any such bugs or errors, the deploying user need only review the configuration instructions for errors, greatly decreasing time spent debugging or repairing non-functional clusters.

As software containerization has gained popularity, containerized application deployment tools for managing large scale deployments across several nodes or several clusters have emerged. One such application is the Kubernetes® open-source container-orchestration system for automating computing application deployment, scaling, and management. Kubernetes® and other container-orchestration systems may facilitate and manage delivery to a deployment cluster of cluster configuration files, written by the user to configure a computing cluster to execute a containerized software application, user credentials files identifying the user as a user authorized to configure the cluster in such a way, and immutable images of the underlying software application container. A master node operating at the deployment cluster may execute an agent of the container-orchestration system to configure minion nodes within the deployment cluster according to the received cluster configuration files and user credentials files.

Each minion node may comprise a separate computing machine or information handling system, and may contain one or more computing pods. Each pod may execute at least one containerized software application. On occasion, a pod may execute two closely-related containerized software applications, such as a first application for retrieving datasets, and a second application for updating or editing those same datasets. A single minion node may execute multiple pods, with each pod executing a different instance of the same containerized software application. This may allow the minion node to quickly scale and balance the load of calls to the containerized software application across a plurality of pods, as well as decrease any downtime associated with bugs or errors occurring at a single pod. Similarly, a single cluster may execute multiple minion nodes, with each node executing a different instance of the same containerized software application to decrease any downtime associated with failures at any specific information handling system or node within the cluster.

Existing container-orchestration systems facilitate creation, updating or editing, transmission, and enforcement of cluster configuration files and user credentials files, and can be used to identify the way in which a given cluster is supposed to be configured according to these files. However, these container-orchestration systems do not provide an ability to determine the actual configuration of such a cluster, or to track the ways in which such configurations have changed over time or between multiple pods, nodes, or clusters. The actual configuration of a given cluster, and the differences between that configuration and other cluster, node, or pod configurations may shed light on any bugs, errors, or failures occurring at the given cluster (and its nodes or pods) or at other clusters configured to run the same containerized software application. For example, one cluster may be executing a later version of the containerized software application than another cluster, causing the two clusters to operate inconsistently. As another example, an unauthorized user may edit the libraries or shared volumes required for execution of the containerized software application at one of the clusters, but not another. If the unauthorized user made such changes manually (e.g., by circumventing the master node executing the agent of the container-orchestration system), the authorized user may not be aware of these changes until the reconfigured cluster generates errors or bugs. A system is needed to identify when changes are made to the configuration of a computing cluster executing a containerized software application, notify an authorized user of an unauthorized reconfiguration, and track and compare those changes over time.

The Kubernetes® Immutable Resource Log (KIRL) cluster seeding and security system in embodiments of the present disclosure address these issues by storing several versions of cluster configuration files enforced at various clusters over time within a structured KIRL root directory. Further, authorized users for each of the clusters may be tracked within the structured KIRL root directory, allowing for the addition and removal of authorized users, as well as associations between authorized users and each of the stored cluster configuration files according to embodiments herein. This may allow the KIRL cluster seeding and security system to identify which user performed a specific change to a cluster configuration file, resulting in performance of one cluster, pod, or node that is inconsistent with performance at another cluster, pod, or node.

In addition, the KIRL cluster seeding and security system of embodiments of the present disclosure may allow users to insert user-specified code editing labels within cluster configuration files. These labels may note which project generated the cluster configuration files, or the stage of development or deployment for the containerized software application at which the cluster configuration file was created, for example. These labels may differ from "tags" made available via existing container-orchestration systems, in that the same user-specified code editing label (e.g., "testing") may be applied to multiple configuration files, while traditional "tags" may only be applied to a single configuration file. Users may search across "tags" or user-specified code editing labels in order to find configuration files incorporating such tags or labels. For example, in existing container-orchestration systems, a user may search for the tag "testing," and the container-orchestration system may return only the latest configuration file (e.g., most recently transmitted to a master node for enforcement) incorporating the tag "testing." In contrast, a user of the KIRL cluster seeding and security system in embodiments described herein may search for the label "testing," and retrieve several different configuration files, each written during a separate phase of testing. This may allow the KIRL cluster seeding and security system user to analyze evolution of the cluster configuration throughout the testing process, for example.

Additionally, existing container-orchestration systems cannot ascertain the current configuration of a given cluster, because these systems do not scan or analyze the configuration files or user credentials files actually executing at the cluster. Rather, the existing container-orchestration systems simply refer the user to the last known files transmitted to the master node of that cluster, indicating how the cluster should be configured, according to instructions received by the container-orchestration system. The KIRL cluster seeding and security system in embodiments described herein determines the actual configuration of each cluster by routinely retrieving the cluster configuration files and user credentials files stored at the master node for each cluster. These files may then be compared against the files most recently transmitted by the KIRL cluster seeding and security system in order to determine whether an outside agent or unauthorized user has manually modified the cluster configuration. In addition, these files may be stored within the KIRL root directory and used to identify specific changes made to the cluster configuration by these configuration files. If an unauthorized or manual modification is detected, the KIRL cluster seeding and security system may display a warning indicating that an unauthorized reconfiguration of the cluster has occurred, prompting the user to investigate further. In such a way, the KIRL cluster seeding and security system of the present disclosure may identify when changes are made to the configuration of a computing cluster executing a containerized software application, notify an authorized user of an unauthorized reconfiguration, and track and compare those changes over time.

The KIRL cluster seeding and security system of the present disclosure may thus assist computing engineers responsible for deployment and maintenance of containerized software applications across a plurality of computing clusters or nodes. Such computing engineers may, for example, be employees of a software application developer executing instances of their proprietary applications across such computing clusters. As another example, such computing engineers may be IT professionals of an enterprise business using a third-party containerized software application running on enterprise owned computing clusters during the course of the enterprise's business activities. As yet another example, the computing engineer may be employed by a cloud hosting service hosting access by its customers or clients to a third-party software application running on computing clusters owned, operated, and maintained by the cloud hosting service. In other words, the KIRL cluster seeding and security system may provide debugging and security services useful to any computing engineer tasked with maintenance of a computing cluster, regardless of who developed the underlying containerized software application, or who is making calls to execute the underlying containerized software application.

Further, the KIRL cluster seeding and security system in embodiments described herein may allow such computing engineers to view and navigate the ways in which different computing clusters have been configured over time. This may assist a computing engineer in determining why a first computing cluster, configured in a first fashion is outperforming or underperforming a second computing cluster, configured in a second fashion. It may also assist a computing engineer in determining why performance of a given computing cluster has fluctuated (e.g., increased or decreased) at various points in time at which the cluster was reconfigured. Computing engineers may thus use the KIRL cluster seeding and security system to correlate performance of computing clusters with various configurations for execution of a containerized software application.

FIG. 1 illustrates an information handling system 100 according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile computing device, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palm-top computer, a laptop computer, a tablet computer, a desktop computer, an augmented reality system, a virtual reality system, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In an embodiment, the information handling system may include a Kubernetes® Immutable Resource Log (KIRL) cluster seeding and security system 170 that may be any device or devices that execute instructions, parameter, and profiles 172 to identify when changes are made to the configuration of a computing cluster executing a containerized software application, notify an authorized user of an unauthorized reconfiguration, and track and compare those changes over time, as described herein. The information handling system 100 may include a memory 104, (volatile (e.g. random-access memory, etc.), nonvolatile memory (read-only memory, flash memory etc.) or any combination thereof), one or more processing resources, such as a central processing unit (CPU), a graphics processing unit (GPU), either of which may be the processor 102 illustrated in FIG. 1, hardware or software control logic, or any combination thereof. Additional components of the information handling system 100 may include one or more storage devices 106 or 114, a control device 116, a network interface device 130, one or more communications ports for communicating with external devices, as well as, various input and output (I/O) devices 112, such as a keyboard, a mouse, or any combination thereof. A power management unit 120 supplying power to the information handling system 100, via a battery 121 or an alternating current (A/C) power adapter 122 may supply power to one or more components of the information handling system 100, including the processor 102, and the network interface device 130.

The information handling system 100 may further include a video display 110. The video display 110 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 172 that may operate on servers or systems, remote data centers, or on-box in individual client information handling systems 100 according to various embodiments herein. In some embodiments, it is understood any or all portions of code instructions 172 may operate on a plurality of information handling systems 100.

The information handling system 100 may include a processor 102 such as a central processing unit (CPU), a GPU, embedded controllers or control logic or some combination of the same. Any of the processing resources may operate to execute code that is either firmware or software code. Moreover, the information handling system 100 may include memory such as main memory 104, static memory 106, containing computer readable medium 171 storing instructions 172. Instructions 172 may include a KIRL cluster seeding and security system 170, operating system (OS) software, application software, BIOS software, or other software applications or drivers detectable by processor type 102. The disk drive unit 114 and static memory 106 may also contain space for data storage. The instructions 172 in an embodiment may reside completely, or at least partially, within the main memory 104, the static memory 106, and/or within the disk drive 114 during execution by the processor 102. The information handling system 100 may also include one or more buses 108 operable to transmit communications between the various hardware components such as any combination of various input and output (I/O) devices, display 110, or the network interface device 130, or the like.

The network interface device 130 may provide connectivity of the information handling system 100 to the network 140 in an embodiment. The network 140 in some embodiments may be a wired local area network (LAN), a wireless personal area network (WPAN), a public WiFi communication network, a private WiFi communication network, a public WiMAX communication network, or other non-cellular communication networks. In other embodiments, the network 140 may be a wired wide area network (WAN), a private LTE communication network, a 4G LTE public communication network, or a 5G millimeter-wave (mm-wave) communication network, or other cellular communication networks. Connectivity to any of a plurality of networks 140 in an embodiment may be via wired or wireless connection. In some aspects of the present disclosure, the network interface device 130 may operate two or more wireless links. In other aspects of the present disclosure, the information handling system 100 may include a plurality of network interface devices, each capable of establishing a separate wireless link to network 140, such that the information handling system 100 may be in communication with network 140 via a plurality of wireless links.

The network interface device 130 may operate in accordance with any cellular wireless data communication standards. To communicate with a wireless local area network, standards including IEEE 802.11 WLAN standards, IEEE 802.15 WPAN standards, WiMAX, or similar wireless standards may be used. The network interface device 130, in other embodiments, may connect to any combination of macro-cellular wireless connections including 2G, 2.5G, 3G, 4G, 5G or the like from one or more service providers.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 172 or receives and executes instructions, parameters, and profiles 172 responsive to a propagated signal, so that a device connected to a network 140 may communicate voice, video or data over the network 140. Further, the instructions 172 may be transmitted or received over the network 140 via the network interface device 130. The information handling system 100 may include a set of instructions 172 that may be executed to cause the computer system to perform any one or more of the methods or computer-based functions disclosed herein. For example, instructions 172 may include a particular example of a KIRL cluster seeding and security system 170, or other aspects or components. Various software modules comprising application instructions 172 may be coordinated by an operating system (OS), and/or via an application programming interface (API). An example operating system may include Windows®, Android®, and other OS types. Example APIs may include Win 32, Core Java API, or Android APIs. Application instructions 172 may also include any application processing drivers, or the like executing on information handling system 100.

The KIRL cluster seeding and security system 170 may utilize a computer-readable medium 171 in which one or more sets of instructions 172 such as software may be embedded. The instructions 172 may embody one or more of the methods or logic as described herein. For example, instructions relating to the KIRL cluster seeding and security system 170, software algorithms, processes, and/or methods may be stored here. As explained, some or all of the KIRL cluster seeding and security system 170 may be executed locally or remotely.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The instructions, parameters, and profiles 172 of the KIRL cluster seeding and security system 170 may be stored in static memory 106, or the drive unit 114 on a computer-readable medium 171 such as a flash memory or magnetic disk in an example embodiment. While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the KIRL cluster seeding and security system 170 that may be operably connected to the bus 108. The KIRL cluster seeding and security system 170 may, according to the present description, perform tasks related to identifying when changes are made to the configuration of a computing cluster executing a containerized software application, notifying an authorized user of an unauthorized reconfiguration, and tracking and comparing those changes over time. The KIRL cluster seeding and security system in an embodiment may allow computing engineers to view and navigate the ways in which different computing clusters have been configured over time to determine why a first computing cluster, configured in a first fashion is outperforming or underperforming a second computing cluster, configured in a second fashion, or why performance of a given computing cluster has fluctuated (e.g., increased or decreased) at various points in time at which the cluster was reconfigured, for example. In an embodiment, the KIRL cluster seeding and security system 170 may communicate with the main memory 104, the processor 102, the power management unit 116, the video display 110, the input device 112, and the network interface device 130, via bus 108, and several forms of communication may be used, including ACPI, SMBus, a 24 MHZ BFSK-coded transmission channel, or shared memory. Driver software, firmware, controllers and the like may communicate with applications (e.g., 170) on the information handling system 100, and various hardware systems.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
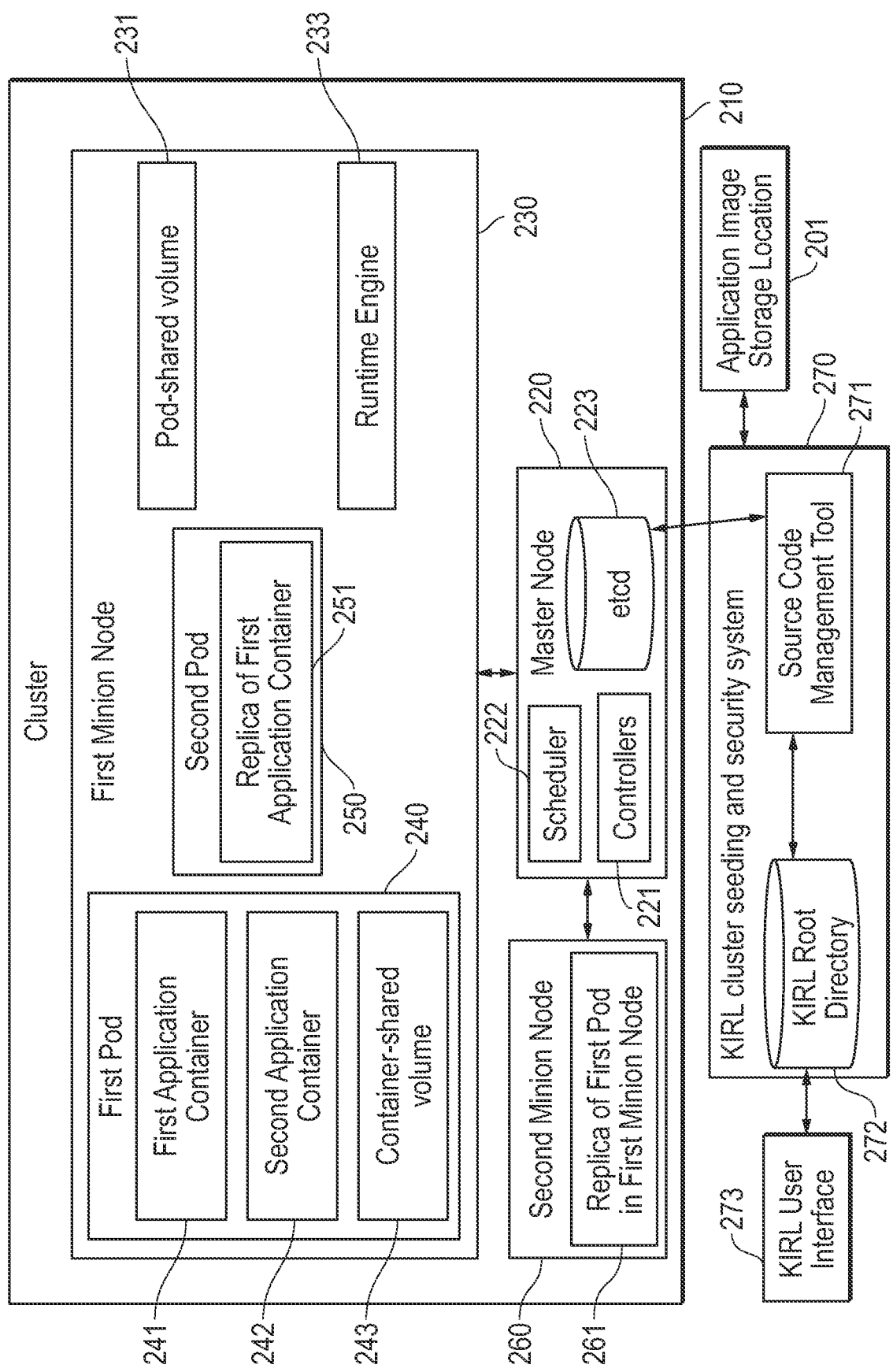
FIG. 2 is a block diagram illustrating a Kubernetes® Immutable Resource Log (KIRL) cluster seeding and security system according to an embodiment of the present disclosure.

FIG. 2 is a block diagram illustrating a Kubernetes® Immutable Resource Log (KIRL) cluster seeding and security system managing code edits to configuration files enforced at a computing cluster according to an embodiment of the present disclosure. As described herein, the KIRL cluster seeding and security system in an embodiment may allow computing engineers to view and navigate the ways in which different computing clusters have been configured over time to correlate performance of computing clusters with various configurations for execution of a containerized software application. For example, KIRL cluster seeding and security system may assist a computing engineer in determining why a first computing cluster, configured in a first fashion is outperforming or underperforming a second computing cluster, configured in a second fashion. As another example, it may also assist a computing engineer in determining why performance of a given computing cluster has fluctuated (e.g., increased or decreased) at various points in time at which the cluster was reconfigured.

Such computing engineers may, for example, be employees of a software application developer executing instances of their proprietary applications across such computing clusters. As another example, such computing engineers may be IT professionals of an enterprise business using a third-party containerized software application running on enterprise owned computing clusters during the course of the enterprise's business activities. As yet another example, the computing engineer may be employed by a cloud hosting service hosting access by its customers or clients to a third-party software application running on computing clusters owned, operated, and maintained by the cloud hosting service. In other words, the KIRL cluster seeding and security system may provide debugging and security services useful to any computing engineer tasked with maintenance of a computing cluster, regardless of who developed the underlying containerized software application, or who is making calls to execute the underlying containerized software application.

The use of containerized software applications facilitates this abstraction or separation between the user of a software application (e.g., making calls to the application), the software application itself, and the computing environment (e.g., computing cluster) in which the software application is executing. For example, a containerized software application may include application code instructions that, when executed, provide services to the user, client, or customer of the software application. The first application container 241, second application container 242, or replica of first application container 251 may each include one or more of such application code instructions, in an example embodiment. These containers (e.g., 241, 242, or 251) in an embodiment may store an "image," or compiled, executable set of code instructions for the containerized software application.

A run-time engine 233 may access and execute these compiled, executable sets of code instructions according to calls made by the application user, client, or customer to perform such executions. For example, a user, client, or customer may transmit a user instruction to search a database for a keyword, and the runtime engine (e.g., 233) may initiate execution of the code instructions within the image of a containerized software application (e.g., 241, 242, or 251) for performing such a search. The runtime engine (e.g., 233) and the containerized software application (e.g., 241, 242, or 251) it executes in an embodiment may operate on the same physical computing machine or information handling system, called a node. For example, runtime engine 233 and the containerized software applications 241, 242, and 251 in an embodiment may operate or be stored in memory of the first minion node 230. A plurality of such nodes may be grouped together to form a cluster. For example, the cluster 210 in an embodiment may include the first minion node 230, the second minion node 260, and a master node 220. The master node 220 in an embodiment may manage configuration of each of the minion nodes 230 and 260.

Software application containerization separates node configuration instructions from the code instructions for executing the underlying containerized software application (e.g., 241, 242, or 251), allowing users to deploy the underlying containerized software application (e.g., 241, 242, or 251) to any computing cluster (e.g., 210) or node (e.g., 230 or 260). As software containerization has gained popularity, containerized application deployment tools, such as container-orchestration systems for automating computing application deployment, scaling, and management across several nodes (e.g., 230 or 260) or several clusters (e.g., 210) have emerged. Such container-orchestration systems may facilitate and manage delivery to a deployment cluster (e.g., 210) of cluster configuration files, written by the user to configure a computing cluster (e.g., 210), or nodes (e.g., 230 or 260) therein, to execute a containerized software application (e.g., 241, 242, or 251), user credentials files identifying the user as a user authorized to configure the cluster (e.g., 210) or nodes (e.g., 230 or 260) in such a way, and immutable images of the underlying software application container (e.g., 241, 242, or 251). A master node operating at the deployment cluster (e.g., 210) may execute an agent of the container-orchestration system to configure minion nodes (e.g., 230 or 260) within the deployment cluster (e.g., 210) according to the received cluster configuration files and user credentials files.

Each minion node (e.g., 230 or 260) may comprise a separate computing machine or information handling system, and may contain one or more computing pods (e.g., 240, 250, or 261). Each pod (e.g., 240, 250, or 261) may execute at least one containerized software application (e.g., 241 and 242 executing at pod 240, or 251 executing at 250). On occasion, a pod (e.g., 240) may execute two closely-related containerized software applications (e.g., 240 and 241), such as a first application for retrieving datasets, and a second application for updating or editing those same datasets. A single minion node (e.g., 230) may execute multiple pods (e.g., 240, 250), with each pod (e.g., 240, 250) executing a different instance of the same containerized software application (e.g., the first application container 241 executing at the first pod 240, and a replica of the first application container 251 executing at the second pod 250). This may allow the minion node (e.g., 230) to quickly scale and balance the load of calls to the containerized software application (e.g., first application container 241 or replica of first application container 251) across a plurality of pods (e.g., 240, 250), as well as decrease any downtime associated with bugs or errors occurring at a single pod (e.g., 240 or 250). Similarly, a single cluster (e.g., 210) may execute multiple minion nodes (e.g., 230 or 260), with each node (e.g., 230 or 260) executing a different instance of the same containerized software application to decrease any downtime associated with failures at any specific information handling system or node (e.g., 230 or 260) within the cluster (e.g., 210).

Clusters, nodes, and pods in an embodiment may be configured to execute one or more containerized software applications in such a way based on a cluster configuration file written by a user of a container-orchestration system, or a user of the KIRL cluster seeding and security system. The cluster configuration file may provide the code instructions the runtime engine may need in order to successfully retrieve the image of the containerized software application and execute it. These code instructions may include, for example, identification of the image and its storage location at a given node, or identification and locations of libraries or volumes to which portions of the image code instructions point. As another example, these code instructions in an embodiment may dictate a preset number of pods or nodes that will execute the containerized software application, and may include descriptive metadata, including user-specified labels identifying various aspects of the application deployment event with which the cluster configuration file is associated. Such a deployment may also require a user credentials file that defines which users are authorized to configure a given cluster, node, or pod.

For example, a user of the KIRL cluster seeding and security system 270 in an embodiment may create or edit a cluster configuration file for configuring a cluster 210 to execute one or more containerized software applications, or a user credentials file identifying one or more users authorized to configure the cluster 210, via a KIRL user interface 273. The source code management tool 271 in an embodiment may operate to track any changes made between the edited cluster configuration file received via the KIRL user interface 273 in such a way, and a currently applied cluster configuration file, or a cluster configuration file previously enforced at the cluster identified within the edited cluster configuration file received via the KIRL user interface 273. In another aspect of an embodiment, the KIRL cluster seeding and security system may operate to track any changes made between an edited user credentials file received via the KIRL user interface 273 in such a way, and a currently applied user credentials file, or a user credentials file previously enforced at the cluster identified within the edited user credentials file received via the KIRL user interface 273.

The user may also provide confirmation of a user instruction to configure the computing cluster 210 according to the cluster configuration file received via the KIRL user interface 273. Such a confirmation in an embodiment may also be referred to herein as a user-commit instruction, or an instruction to commit the cluster 210 to the configuration described in the user-provided cluster configuration file. Upon receipt of such a user-commit instruction, or confirmation, the KIRL cluster seeding and security system 270 may store the received cluster configuration file within a KIRL root directory 272, as described in greater detail with respect to FIG. 6. The KIRL cluster seeding and security system 270 may also retrieve an immutable or unchangeable container for one or more containerized software applications the cluster 210 will be configured to execute from an application image storage location 201, or from the KIRL user interface 273. For example, the KIRL cluster seeding and security system 270 may receive an image of a first application container 241, or a second application container 242. Any containerized software application is contemplated, and the image may contain the code instructions for execution of the software application, and any libraries or volumes necessary for such execution. For example, the containerized software application 241 in an embodiment may be the open-source software program Nginx®, which may be used as a web server, reverse proxy, load balancer, mail proxy and HTTP cache. The KIRL cluster seeding and security system 270 in an embodiment may also store the images of these containerized software applications (e.g., 241 and 242) within the KIRL root directory 272. The KIRL cluster seeding and security system 270 may then transmit to a master node 220 operating within the computing cluster 210 the cluster configuration file for configuring cluster 210 to execute the containerized applications (e.g., 241 or 242), user credentials file providing user credentials sufficient to authorize configuration of the cluster 210 according to the transmitted cluster configuration file, and one or more images of the containerized software applications (e.g., 241 or 242) to the particular cluster 210 of the present embodiment.

Computing cluster 210 in an embodiment may comprise a master node 220 directing operation of one or more minion nodes, such as first minion node 230 and second minion node 260. The master node 220 in an embodiment may store the received cluster configuration file, user credentials file, and software application container images within a Kubernetes® Unix proprietary "etcetera distributed" (etcd) storage location 223. A scheduler 222 operating at the master node 220 in an embodiment may monitor etcd storage 223 to identify when a new pod has been configured (e.g., as identified in a newly received and stored cluster configuration file), and assign an available node (e.g., 240 or 260) to host and execute that pod. Thus, upon storage of the cluster configuration file for configuring cluster 210 to execute the containerized applications (e.g., 241 or 242), the scheduler 222 may assign the containerized applications 241 and 242 to the first minion node 230. The controller 221 in an embodiment may then configure one or more pods (e.g., first pod 240 or second pod 250) to execute one or more of the containerized software applications (e.g., 241 or 242) identified within the newly stored cluster configuration file.

Once configured, the cluster 210 may then execute the underlying containerized software applications (e.g., 241 or 242) via a runtime engine 233 operating to access and execute various portions of the underlying containerized software applications (e.g., 241 or 242) stored at the computing cluster as an immutable or unchangeable memory image within the application containers (e.g., 241 or 242) operating separate and apart from the operating system (OS) of the cluster 210. Storing the containerized software application image in such a way may inhibit any inadvertent changes made to the underlying software application code instructions during configuration of the cluster 210. This method may ensure that any bugs or errors resulting from deployment of the containerized software application (e.g., 241 or 242) at cluster 210 are caused by the configuration of the cluster 210, as dictated by the newly stored cluster configuration files within etcd 223, rather than execution of the underlying software application code instructions itself, as given within the images stored in containers 241 or 242. Thus, in order to remedy any such bugs or errors, the deploying user need only review the configuration instructions given within the newly stored cluster configuration file for errors, greatly decreasing time spent debugging or repairing non-functional clusters.

Minion nodes 230 and 260 in an embodiment may each comprise a separate computing machine or information handling system, and may contain one or more computing pods in some embodiments. For example, the first minion node 230 may contain a first pod 240 and a second pod 250. Each pod may store a container for at least one containerized software application. For example, the first minion node 230 may contain a first application container 241, and a second application container 242. This may occur in an embodiment when the containerized software applications 241 and 242 are closely related. For example, the first application 241 may include code instructions executed by a processor to retrieve datasets, and the second application 242 may include code instructions executed by a processor to update or edit those same datasets. In such an embodiment, the first pod 243 may also include a volume of data 243 that is equally accessible to both containers 241 and 242. For example, the container-shared volume 243 may be stored datasets retrieved by the first application container 241, which may then be accessed by the second application container 242 for editing.

In other embodiments, pods may house only one containerized application. For example, second pod 250 may house container 251 for a replica of the first application housed in container 241 at the first pod 240. Multiple pods (e.g., 240 and 250) may house containers for the same containerized application in an embodiment in order to allow the first minion node 230 to balance calls to execute the containerized software application across pods 240 and 250. In such an embodiment, the first minion node 230 may also contain a volume of data 231 accessible by each of the first pod 240 and the second pod 250. Such a pod-shared volume 231 may contain, for example, common libraries or other data needed to execute the containerized software applications stored at the first pod 240 and the second pod 250. For example, the pod-shared volume 231 may contain libraries necessary for the execution of the containerized software application stored within the first application container 241 and the replica 251 of the first application container.

Such cloning or replication of the same application container (e.g., 241 and 251) in an embodiment may allow for quick scaling and load balancing of calls to the containerized software application across a plurality of pods (e.g., 240 and 250), as may decrease any downtime associated with bugs or errors occurring at a single pod (e.g., 240 or 250). Similarly, a cluster 210 may execute multiple minion nodes (e.g., 230 and 260), with each node executing a different instance of the same containerized software application. For example, the second minion node 260 may be configured with a replica 261 of the first pod 240 within the first minion node 230. Such a cloning of pods (e.g., 240 and 261) across multiple nodes (e.g., 230 and 260) in an embodiment may decrease any downtime associated with failures at any specific information handling system or node (e.g., 230 or 260) within the cluster 210.

Figure 3:
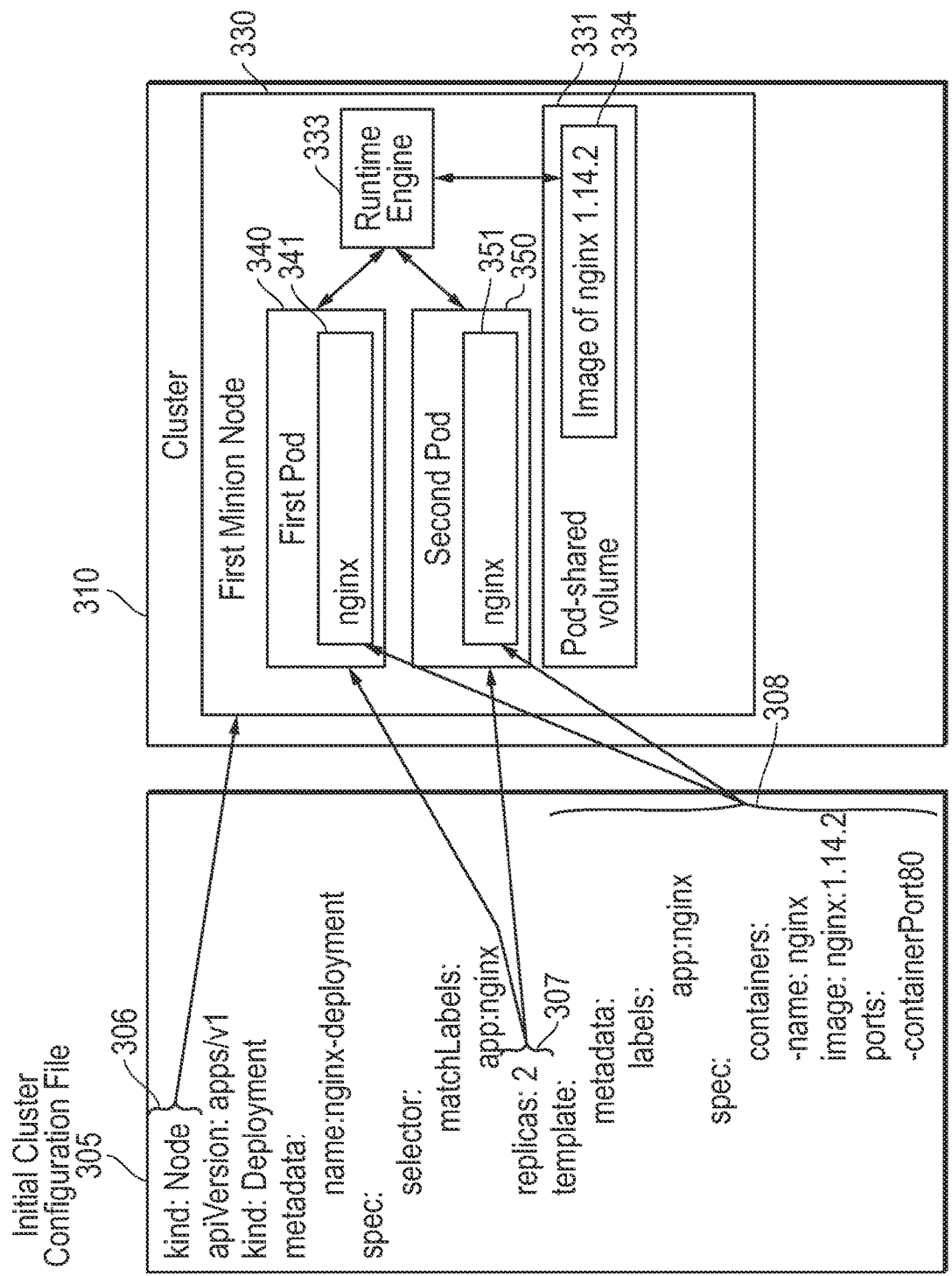
FIG. 3 is a block diagram illustrating a computing cluster configured according to an initial cluster configuration file according to an embodiment of the present disclosure.

FIG. 3 is a block diagram illustrating a computing cluster 310 configured according to an initial cluster configuration file 305 to execute a single containerized software application at multiple pods of the cluster according to an embodiment of the present disclosure. As described herein, a computing cluster 310 may be configured to execute one or more containerized software applications according to a cluster configuration file. A single cluster configuration file (e.g., 305) in an embodiment may operate to configure a plurality of clusters, nodes, or pods. For example, a user in an embodiment may create an initial cluster configuration file 305 for initial configuration of a new computing cluster 310 by submitting the initial cluster configuration file 305 to the KIRL cluster seeding and security system via a KIRL user interface. The initial cluster configuration file 305 in an embodiment may include a specification of configuration for a node within the cluster 310 (e.g., minion node 330), or for a specific pod within an identified node. Because each node comprises a separate physical machine, each node may be associated with a different IP address. In contrast, each pod within a single node may be associated with the same IP address. The initial cluster configuration file 305 may indicate at line 306 that the following specification should be used to configure a node (e.g., the first minion node 330). In other embodiments, the line 306 may read "kind: Pod," indicating the following specification may be used to configure only one pod (e.g., first pod 340 or second pod 350) within an identified node.

The initial cluster configuration file 305 may also contain an indicator 307 of the number of instances of the same containerized application the cluster 310 and the first minion node 330 should be configured to execute. For example, line 307 indicates the cluster 310, and the first minion node 330 specifically, should be configured to execute two instances of the same containerized application. Most existing container-orchestration systems may require separate instances of the same containerized application to be housed in separate pods. Because line 307 of the initial cluster configuration file 305 indicates that two replicas should execute at a single node, the container-orchestration system enforcing the initial cluster configuration file 305 may create a first pod 340 for housing a first instance of the container, and a second pod 350 for housing a second instance of the container.

The specification of the initial cluster configuration file 305 in an embodiment may further include a template section 308 describing the application containers the pods 340 and 350 are created to house in greater detail. For example, the template section 308 may contain a label identifying the application housed at pods 340 and 350 as the Nginx® application. As another example, the template section 308 may dictate the containers 341 and 351 should be named "nginx." In yet another example, the template section 308 may identify a name or location for the image immutably storing the container, as well as a port through which that image may be retrieved from an outside storage location. More specifically, the template section 308 may dictate that containers 341 and 351 house an image named "nginx 1.14.2," indicating version 1.14.2 of the Nginx® software application. In some embodiments, the image 334 identified within section 308 may be stored in a pod-shared data volume 331 within the first minion node 330. In other embodiments, the image 334 may be stored one or both the first pod 341 and the second pod 350. Upon configuring the first pod 340 and the second pod 350 to house replicated instances of the same containerized software application (e.g., 341 and 351), the runtime engine 333 of the first minion node 330 may execute portions of the Nginx® software application by invoking portions of the code instructions within the image 334 of Nginx® version 1.14.2.

Figure 4:
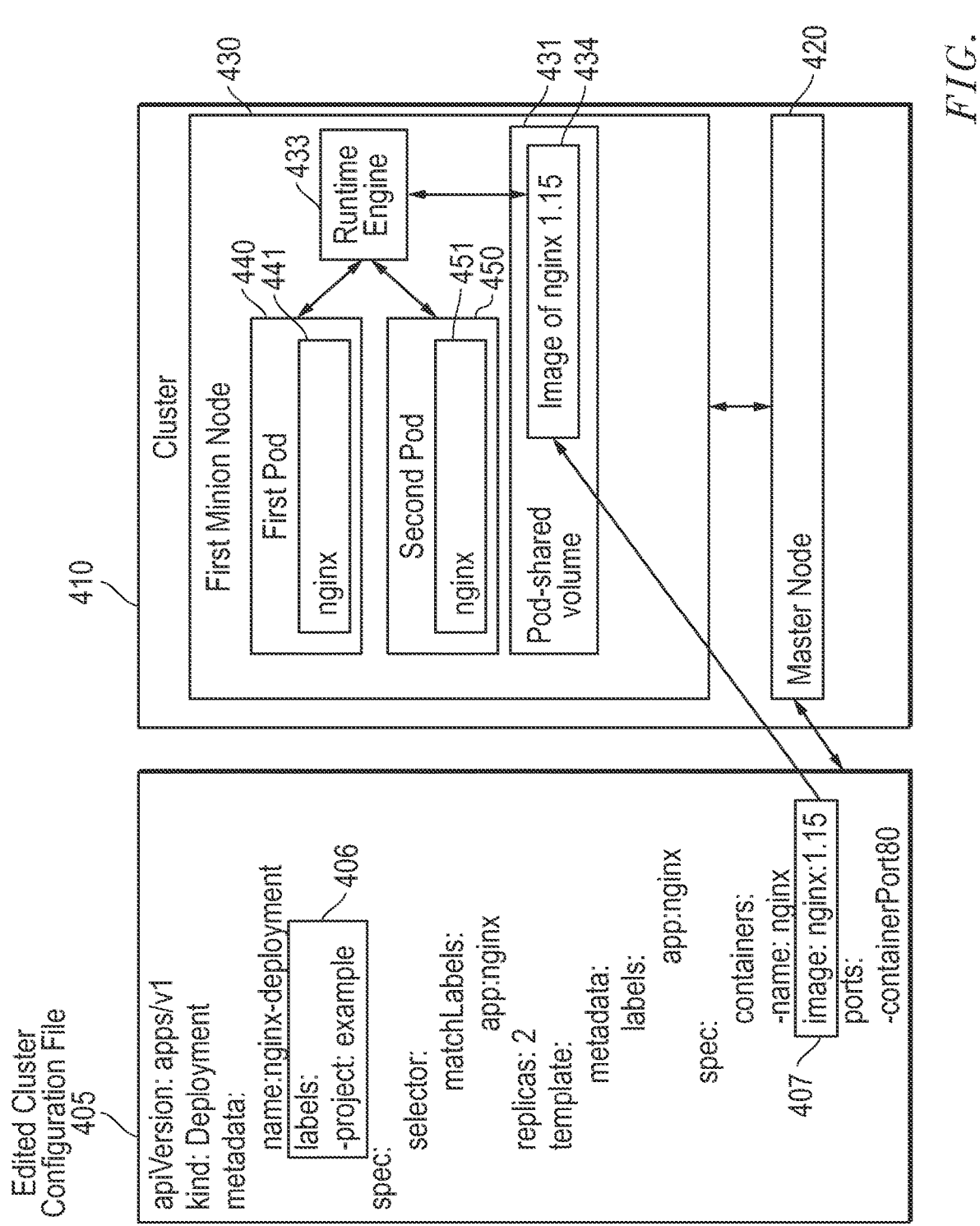
FIG. 4 is a block diagram illustrating a computing cluster reconfigured according to an edited cluster configuration file according to an embodiment of the present disclosure.

FIG. 4 is a block diagram illustrating a computing cluster reconfigured according to an edited cluster configuration file containing user-specified code editing labels to execute a newer version of a containerized software application according to an embodiment of the present disclosure. As described herein, users of the KIRL cluster seeding and security system in an embodiment may use the KIRL user interface to edit the initial cluster configuration file described above with reference to FIG. 3. For example, a user of the KIRL cluster seeding and security system in an embodiment may create an edited cluster configuration file 405 to alter the configuration of a previously-configured cluster 410.

The edited cluster configuration file 405 may comprise an edited, altered, or updated version of the initial configuration file described above with reference to FIG. 3. For example, a user in an embodiment may edit the initial configuration file to add a user-specified code editing label 406 within the edited cluster configuration file 405. In such an embodiment, the user-specified code editing label 406 may provide notation about the code editing process for configuration files configuring cluster 410, or gathered performance metrics for clusters executing containerized software applications according to the configuration file 405, rather than any actionable code instructions relied upon by the master node 420 to configure cluster 410. For example, such a user-specified code editing label may note the project (e.g., entitled "example") under which the cluster 410 was configured according to the edited cluster configuration file 405. As another example, such a user-specified code editing label may note the stage of development, testing, or deployment at which the edited cluster configuration file 405 was created and instituted to configure cluster 410. In yet another example, such a user-specified code editing label may include a notation recording one or more performance metrics (e.g., CPU consumption rate, latency, throughput, etc.) for one or more clusters executing the containerized software application(s) according to the configuration file 405 during a preset time period (e.g., over a month long period specified within the user-specified code editing label).

These user-specified code editing labels (e.g., 406) in an embodiment may differ from "tags" made available via existing container-orchestration systems, in that the same user-specified code editing label (e.g., 406) may be applied to multiple configuration files, while traditional "tags" may only be applied to a single configuration file. Existing container-orchestration systems may store only the most recently committed or enforced cluster configuration files, while the KIRL cluster seeding and security system stores a plurality of configuration files, and tracks the clusters or nodes at which they were enforced, and the time period during which they were enforced at those clusters or nodes. Further, the KIRL cluster seeding and security system may maintain a log correlating any user-specified code labels written into a cluster configuration file with an identification of that cluster configuration file. As described herein, users may search across "tags" or user-specified code editing labels in order to find configuration files incorporating such tags or labels. For example, in existing container-orchestration systems, a user may search for the tag "testing," and the container-orchestration system may return only the latest configuration file (e.g., most recently transmitted to a master node for enforcement) incorporating the tag "testing." In contrast, a user of the KIRL cluster seeding and security system in an embodiment may search for the label "example," and retrieve all of the several configuration files written under the project "example," by referencing the log correlating the label "example" and one or more cluster configuration files identifiers. This may allow the KIRL cluster seeding and security system user to analyze evolution of the cluster configuration throughout the "example" project, for example.

The edited cluster configuration file 405 in an embodiment may also contain material changes to the configuration template defining configuration of cluster 410. For example, a user of the KIRL cluster seeding and security system in an embodiment may edit line 407 to identify a new image to be housed at the pre-established first pod 440 and second pod 450, or stored at the pod-shared volume 431. More specifically, the pod-shared volume 431, first pod 440, or second pod 450 in various embodiments may store a new version 1.15 of the Nginx® software application pursuant to the edited cluster configuration file 405.

Figure 6:
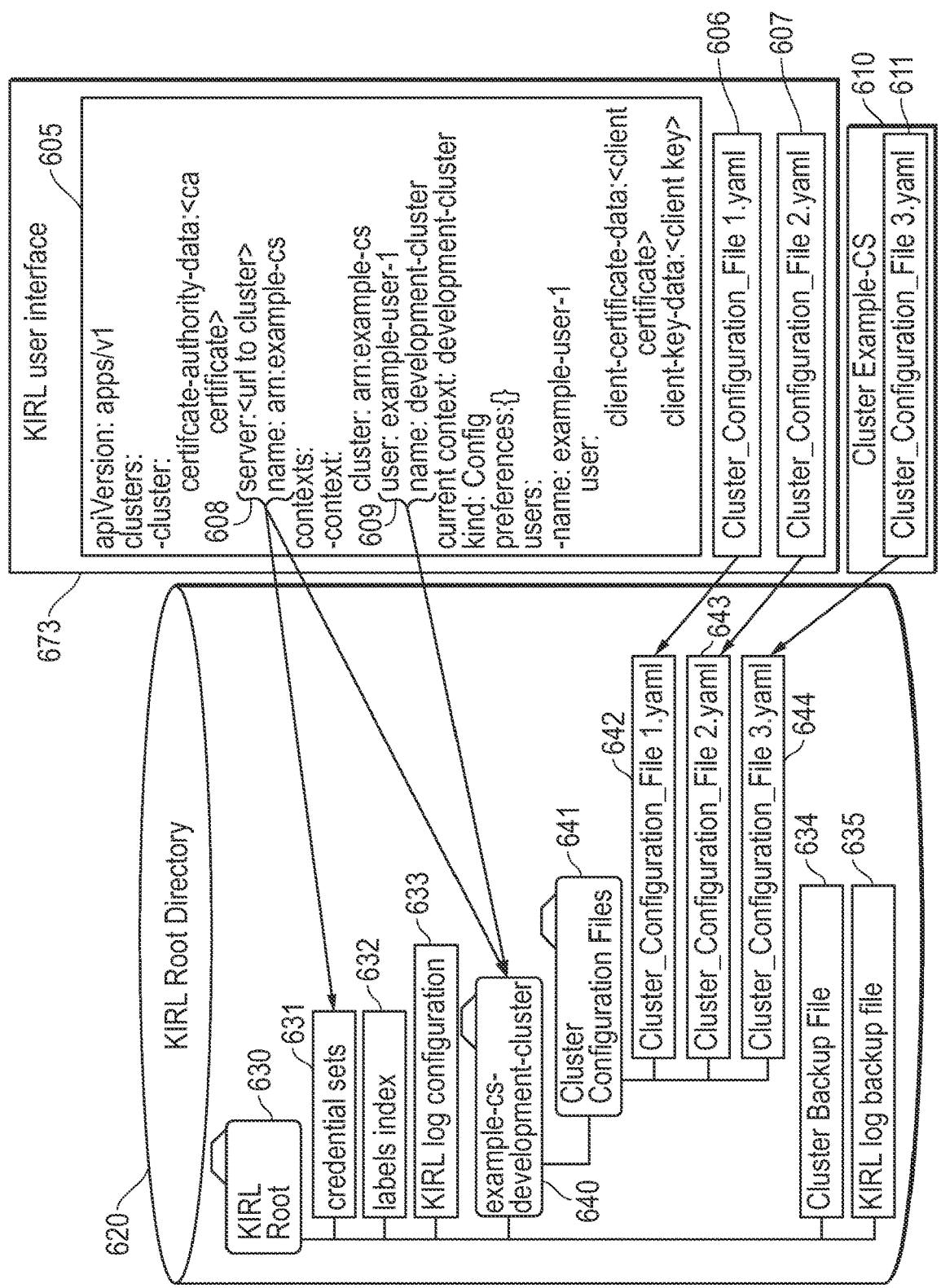
FIG. 6 is a block diagram illustrating a KIRL root directory according to an embodiment of the present disclosure.

As described in greater detail herein with reference to FIG. 6, each configuration file enforced at a computing cluster over time may be stored at the KIRL log root directory. By storing currently enforced configuration files (e.g., 405), as well as previously enforced configuration files (e.g., 305 described with reference to FIG. 3), the KIRL cluster seeding and security system in an embodiment enables users to compare different configurations of the same cluster at different points in time. Further, by storing configuration files (e.g., 405) currently enforced at a first minion node 430, as well as configuration files currently enforced at a second minion node 460, the KIRL cluster seeding and security system in an embodiment enables users to compare different configurations at two different minion nodes at the same point in time. Similar methods may be used, as described herein, to compare configurations between two separate clusters at the same point in time, or between two separate clusters or nodes at two different points in time.

Figure 5:
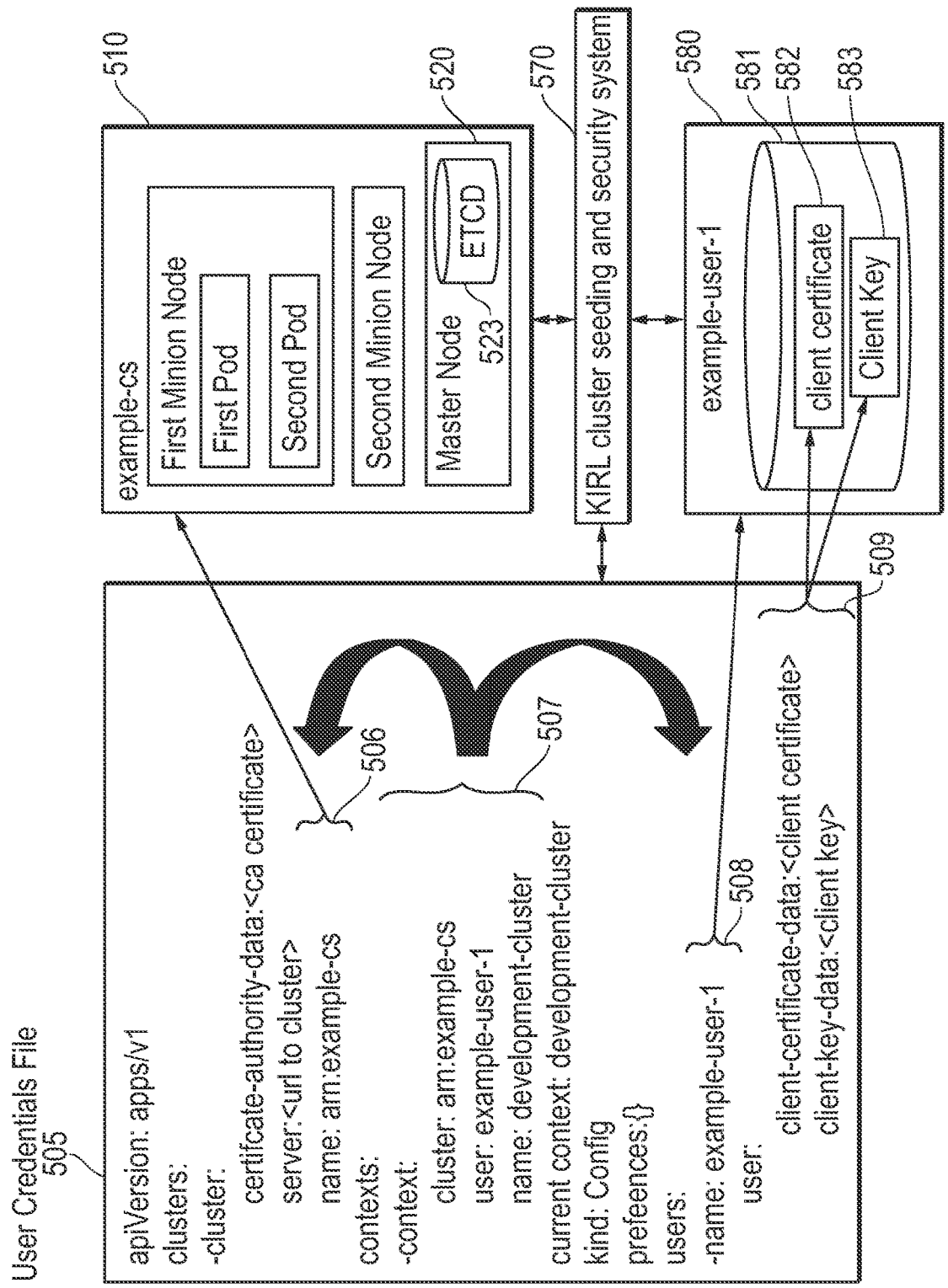
FIG. 5 is a block diagram illustrating a user credentials file according to an embodiment of the present disclosure.

FIG. 5 is a block diagram illustrating a user credentials file 505 providing certificates and keys 509 necessary to authorize a user to configure a computing cluster according to a cluster configuration file according to an embodiment of the present disclosure. As described herein, a user credentials file 505 may identify and authenticate users authorized to configure a computing cluster (e.g., 510). For example, a user credentials file 505 may include an identification of the cluster (e.g., 510) undergoing configuration. More specifically, at line 506, the user credentials file 505 may indicate it pertains to a cluster 510 named "example-cs."

The user credential file 505 may also define one or more users that are authorized to configure the cluster example-cs 510. For example, at line 508, the user credentials file 505 may identify a user "example-user-1" as authorized to perform such a configuration. In some embodiments, the identification of the user (e.g., as given at line 508) may further provide a location (e.g., IP address) for the user's machine 580. At 509, the user credentials file 505 may also provide the name or location for certification of the identified user's machine 580 as the authorized user. For example, the user credentials file 505 at 509 may point to a client certificate 582 and a client key 583 stored in memory 581 at the user's machine 580.

The user credentials file 505 may further include a configuration context 507, which links the cluster to be configured and identification of the user authorized to perform such configuration. For example, the configuration context 507 may identify the cluster as "example-cs" 510, and the user as "example-user-1" 580. The configuration context 507 may also be assigned a name that may indicate the purpose for the current configuration. For example, if the example-cs cluster 510 is being configured by user "example-user-1" 580 as part of the development phase for a containerized application, the configuration context 507 may be assigned the name "development-cluster."

The user credentials file 505 may be transmitted to the master node 520 via the KIRL cluster seeding and security system 570. The master node 520 may store the user credentials file within etcd storage 523, and retrieve the client certificate 582 and client key 583 from the user's machine 580. Prior to configuring the example-cs cluster 510 according to a configuration file received from the user "example-user-1" 580, the master node 520 may determine, based on the retrieved client certificate 582 and client key 583 that the user "example-user-1" 580 is indeed authorized to configure cluster 510.

FIG. 6 is a block diagram illustrating a Kubernetes® Immutable Resource Log (KIRL) root directory storing a plurality of cluster configuration files enforced across a plurality of clusters or across multiple points in time according to an embodiment of the present disclosure. As described herein, the KIRL cluster seeding and security system in an embodiment may identify when changes are made to the configuration of a computing cluster executing a containerized software application, and track and compare those changes over time. As part of this process, the KIRL cluster seeding and security system in an embodiment may store several versions of cluster configuration files enforced at various clusters over time within a structured KIRL root directory 620 maintained at the KIRL cluster seeding and security system memory. For example, a user may initialize a KIRL root directory 620 for tracking changes in configurations made across clusters, nodes, pods, or time periods. Such a root directory 620 in an embodiment may comprise a hierarchical file system for storing cluster configuration files and user credentials files according to the clusters or nodes at which such cluster configuration files or user credentials files are enforced. As described herein, the KIRL cluster seeding and security system in an embodiment may improve upon existing container-orchestration systems by retrieving, storing, and manipulating a plurality of cluster configuration files configuring several cluster or nodes over a period of time, allowing computing engineers to view and navigate the ways in which different computing clusters have been configured over time. The structure of the KIRL root directory 620 in an embodiment may correlate a given cluster configuration file (e.g., 642, 643, or 644) with a specific cluster (e.g., "example-cs") configured at one point in time according to such a cluster configuration file (e.g., 642, 643, or 644). For example, these cluster configuration files (e.g., 642, 643, or 644) may be stored in an embodiment in a folder 640 or storage location having a name (e.g., "example-cs-development-cluster") that includes the name of the cluster (e.g., "example-cs") configured by those cluster configuration files. The structure of the KIRL root directory 620 in an embodiment may also correlate a given cluster configuration file (e.g., 642, 643, or 644) with a configuration context (e.g., "development-cluster") that further refers to a user credentials file defining users authorized to reconfigure the given cluster. For example, these cluster configuration files (e.g., 642, 643, or 644) may be stored in an embodiment in a folder 640 or storage location having a name (e.g., "example-cs-development-cluster") that includes the name of the configuration context (e.g., "development-cluster") for those configurations.

The KIRL cluster seeding and security system in an embodiment may leverage the structure provided by the KIRL root directory 620 in an embodiment to easily locate, retrieve, and compare multiple cluster configuration files stored therein. Such retrieval and comparison capabilities may assist a computing engineer in determining why a first computing cluster, configured in a first fashion is outperforming or underperforming a second computing cluster, configured in a second fashion, or why performance of a given computing cluster has fluctuated (e.g., increased or decreased) at various points in time at which the cluster was reconfigured. Computing engineers may thus use the KIRL cluster seeding and security system to correlate performance of computing clusters with various configurations for execution of a containerized software application.

The KIRL cluster seeding and security system of the present disclosure may thus assist computing engineers responsible for deployment and maintenance of containerized software applications across a plurality of computing clusters or nodes. Such computing engineers may, for example, be employees of a software application developer executing instances of their proprietary applications across such computing clusters. As another example, such computing engineers may be IT professionals of an enterprise business using a third-party containerized software application running on enterprise owned computing clusters during the course of the enterprise's business activities. As yet another example, the computing engineer may be employed by a cloud hosting service hosting access by its customers or clients to a third-party software application running on computing clusters owned, operated, and maintained by the cloud hosting service. In other words, the KIRL cluster seeding and security system may provide debugging and security services useful to any computing engineer tasked with maintenance of a computing cluster, regardless of who developed the underlying containerized software application, or who is making calls to execute the underlying containerized software application.

Upon receipt of the user command to initiate a KIRL root directory 620, the KIRL cluster seeding and security system in an embodiment may generate a KIRL root directory folder 630, containing a plurality of empty data sets. For example, the KIRL cluster seeding and security system may generate an empty credential sets file 631, an empty labels index 632, and a KIRL log configuration 633. The KIRL cluster seeding and security system in such an embodiment may then prompt the user to indicate whether to encrypt the KIRL root directory, or any portion thereof, and the encryption method so applied. A user's responsive encryption instructions in an embodiment may be stored at the KIRL log configuration 633.

Upon initialization of the KIRL root directory 620 in an embodiment, the KIRL cluster seeding and security system may be prepared to receive cluster configuration files, user credentials files, and containerized software application images for deployment to one or more clusters. For example, a user may provide, via the KIRL user interface 673, a user credentials file 605, a first cluster configuration file 606, or a second cluster configuration file 607. In some embodiments, the first cluster configuration file 606 and the second configuration file 607 may configure the same computing cluster (e.g., 610), with the first and second configuration files each configuring the cluster 610 at different points in time. In other embodiments, the first cluster configuration file 606 may configure a first computing cluster (e.g., 610), and the second cluster configuration file 607 may configure a second computing cluster. These first and second computing clusters in various embodiments may operate according to these configuration files at the same point in time, or at different points in time. A user may confirm an instruction to configure a cluster (e.g., 610) according to one of these configuration files (e.g., 606, or 607) by providing a user-commit instruction via the KIRL user interface 673. Upon receipt of such a user-commit instruction in an embodiment, the KIRL cluster seeding and security system may generate a simple hashing algorithm (SHA) identifier based on a timestamp identifying the time of receipt of the user instruction to configure the cluster (e.g., 610) according to the cluster configuration file (e.g., 606, or 607).

Upon receipt of the first configuration file 606 or the second configuration file 607 in an embodiment, the KIRL cluster seeding and security system may access the user credentials file 605 to generate a credential set describing the users authorized to perform configurations at one or more clusters. For example, the KIRL cluster seeding and security system in an embodiment may identify the name of the user credentials file 605, and may identify, at line 608, the name "example-cs" of a computing cluster at which the user credentials file 605 will be enforced. The combination of the name of the user credentials file 605, and the name of the cluster "example-cs" at line 608 may form a single credential set in an embodiment. This credential set may then be stored within the credential sets file 631.

The KIRL cluster seeding and security system in an embodiment may further refer to the name of the cluster identified at line 608 of the user credentials file 605 in order to create a folder for storage of various configuration files enforced at the cluster identified at line 608. For example, the KIRL cluster seeding and security system in such an embodiment may name such a folder by combining the name of the cluster (e.g., "example-cs") found at line 608 with the name of the configuration context (e.g., "development-cluster") given at line 609 of the user credentials file 605, to give the folder name "example-cs-development-cluster" 640. The KIRL cluster seeding and security system in such an embodiment may then store a copy 642 of the first configuration file 606 or a copy 643 of the second configuration file 607 in the folder "example-cs-development-cluster" 640 within a folder of cluster configuration files 641.

This folder of cluster configuration files 641 in an embodiment may store a plurality of configuration files configuring a plurality of clusters, nodes, or pods at various points in time. As described herein, existing container-orchestration systems facilitate creation, updating or editing, transmission, and enforcement of cluster configuration files (e.g., 606, or 607) and user credentials files (e.g., 605), and can be used to identify the way in which a given cluster e.g., 610 is supposed to be configured according to these files. However, these container-orchestration systems do not provide an ability to determine the actual configuration of such a cluster 610, or to track the ways in which such configurations have changed over time or between multiple pods, nodes, or clusters. For example, a user of an existing container-orchestration system may indicate the cluster "example-cs" 610 is configured according to the second configuration file 607, if the second configuration file 607 were the latest configuration file for configuring cluster 610 received by the existing container-orchestration system. The existing container-orchestration system may be incapable of determining the cluster 610 is actually configured according to the third configuration file 611, especially if the existing container-orchestration system was not used to deliver the third configuration file 611 to the cluster 610 (e.g., manual configuration by an outside party).

The KIRL cluster seeding and security system, in contrast, routinely scans the clusters previously configured using the KIRL cluster seeding and security system for updated configuration files. For example, the KIRL cluster seeding and security system in an embodiment may routinely identify the cluster configuration file (e.g., 611) stored at cluster 610 through execution of a cron-job service, and retrieve and store to the cluster configuration files 641 a copy (e.g., 644) of any new cluster configuration files (e.g., 611) not already stored in the KIRL root directory 620. Upon storage of such retrieved copies of currently enforced configuration files at a cluster (e.g., 610) in an embodiment, the KIRL cluster seeding and security system may generate a simple hashing algorithm (SHA) identifier based on a timestamp identifying the time of such storage of the copy (e.g., 644) within the cluster configuration files 641. The copied and stored, currently enforced configuration file (e.g., 644) may then be compared against the files (e.g., 605 and 607) most recently transmitted by the KIRL cluster seeding and security system to the cluster 610, in order to determine whether an outside agent or unauthorized user has manually modified the cluster configuration. If an unauthorized or manual modification is detected, the KIRL cluster seeding and security system may display a warning indicating that an unauthorized reconfiguration of the cluster 610 has occurred, prompting the user to investigate further.

Further, authorized users for each of the clusters may be tracked within the structured KIRL root directory 620, allowing for the addition and removal of authorized users, as well as associations between authorized users and each of the stored cluster configuration files (e.g., 606 or 607). This may allow the KIRL cluster seeding and security system to identify which user performed a specific change to a cluster configuration file (e.g., 606 or 607), resulting in performance of one cluster (e.g., 610), pod, or node that is inconsistent with performance at another cluster, pod, or node.

In addition, the KIRL cluster seeding and security system may allow users to insert user-specified code editing labels within cluster configuration files, as described in greater detail with respect to FIG. 4, above. These labels may note which project generated the cluster configuration files, or the stage of development or deployment for the containerized software application at which the cluster configuration file was created, in some example embodiments. The KIRL cluster seeding and security system in an embodiment may identify one or more such user-specified code editing labels within a received and stored configuration file or copy thereof (e.g., 642, 643, or 644). The user-specified code editing labels so identified may then be stored within the labels index folder 632, along with the SHA identifier associated with the copy (e.g., 642, 643, or 644) of the configuration file in which the label was identified. Such an association within the labels index 632 may facilitate a user search for the identified label across a plurality of cluster configuration files stored within the cluster configurations folder 641, as described in greater detail with respect to FIG. 9, below.

One or more backup files may also be stored within the KIRL root directory 620 in an embodiment. For example, the KIRL root directory 620 may store a cluster backup file 634 containing a copy of a configuration file for one or more clusters. This cluster backup file 634 may represent the latest configuration file (e.g., 607 or copy 643) for a specific cluster (e.g., 610). The latest configuration file (e.g., 607 or copy 643) may be the configuration file most recently received via the KIRL user interface 673 in some embodiments. In other embodiments, this cluster backup file 634 may represent the configuration file (e.g., 611 or copy 644) most recently determined to be currently enforced at the cluster 610. The configuration file (e.g., 611 or copy 644) most recently determined to be currently enforced at the cluster 610 in an embodiment may not be the same as the latest configuration file (e.g., 607 or copy 643) most recently received via the KIRL user interface 673 in an embodiment if, for example, the cluster 610 was most recently configured without using the KIRL user interface 673, or by circumventing the KIRL cluster seeding and security system. As another example, the KIRL root directory 620 in an embodiment may store a KIRL log backup file 635, which may contain a compressed copy of everything within the KIRL root directory 620. By storing credential sets, label index, KIRL log configuration, various backups and a plurality of configuration files in such a way, the KIRL root directory 620 may be used by the KIRL cluster seeding and security system to identify when changes are made to the configuration of a computing cluster executing a containerized software application, notify an authorized user of an unauthorized reconfiguration, and track and compare those changes over time.

Figure 7:
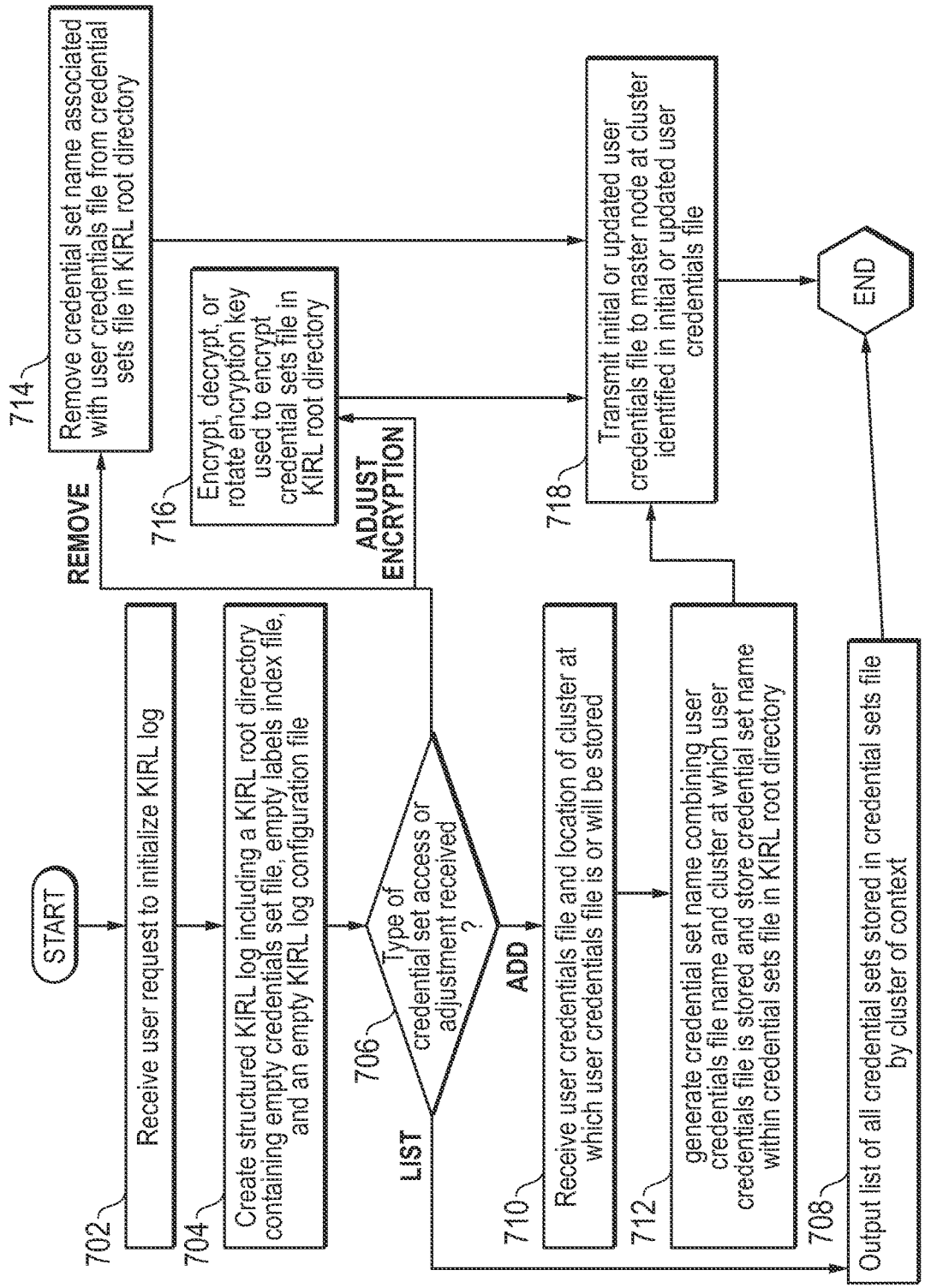
FIG. 7 is a flow diagram illustrating a method of generating and populating a KIRL root directory according to an embodiment of the present disclosure.

FIG. 7 is a flow diagram illustrating a method of generating and populating a Kubernetes® Immutable Resource Log (KIRL) root directory according to an embodiment of the present disclosure. The KIRL root directory may be used for storage of cluster configuration files and user credentials files created or edited using the KIRL cluster seeding and security system in some embodiments. As described herein, by storing credential sets, label index, KIRL log configuration, various backups and a plurality of configuration files in such a way, the KIRL root directory 620 may be used by the KIRL cluster seeding and security system to identify when changes are made to the configuration of a computing cluster executing a containerized software application, notify an authorized user of an unauthorized reconfiguration, and track and compare those changes over time.

At block 702, the KIRL cluster seeding and security system in an embodiment may receive a user request to initialize a KIRL log for tracking changes in configurations of computing clusters over time. For example, in an embodiment described with respect to FIG. 2, a user may instruct the KIRL cluster seeding and security system 270 to initialize a KIRL root directory 272 by entering the user command "init" or "initialize" within the KIRL user interface 273. As another example, in an embodiment described with respect to FIG. 6, a user may initialize a KIRL root directory 620 for tracking changes in configurations made across clusters, nodes, pods, or time periods.

The KIRL cluster seeding and security system in an embodiment may create a structured KIRL log including a KIRL root directory containing empty credentials set file, an empty labels index file, and an empty KIRL log configuration file at block 704. For example, in an embodiment described with reference to FIG. 6, upon receipt of the user command to initiate a KIRL root directory 620, the KIRL cluster seeding and security system in an embodiment may generate a KIRL root directory folder 630, containing a plurality of these empty data sets. For example, the KIRL cluster seeding and security system may generate an empty credential sets file 631, an empty labels index 632, and a KIRL log configuration 633.

At block 706, the KIRL cluster seeding and security system in an embodiment may determine which type of user instruction regarding user credential sets has been received via the KIRL user interface. For example, in an embodiment described with reference to FIG. 2, the user may enter a user command to list user credentials sets stored within a user-specified KIRL root directory 272, add credential sets, remove credential sets, or adjust encryption associated with credential sets via the KIRL user interface 273. If the user has entered a command to list credential sets, the method may proceed to block 708 for reporting of such requested credential sets. If the user has entered a command to add credential sets or new authorized users, the method may proceed to block 710 to add such credential sets or authorized users to stored user credential files and credential set files. If the user has entered a command to remove an authorized user or credential set, the method may proceed to block 714 to disassociate the removed user from one or more clusters within stored credential sets and user credential files. If the user has entered a command to adjust encryption associated with a credential set, the method may proceed to block 716 for application of the requested adjustment to such encryption methods.

The KIRL cluster seeding and security system in an embodiment in which a user instruction to list credential sets has been received may output a list of all credential sets stored in the credential sets file at block 708. For example, in an embodiment described with reference to FIG. 6, upon receipt of the user credentials file 605, the KIRL cluster seeding and security system may access the user credentials file 605 to generate a credential set describing the users authorized to perform configurations at one or more clusters (e.g., 610). For example, the KIRL cluster seeding and security system in an embodiment may identify the name of the user credentials file 605, and may identify, at line 608, the name "example-cs" of a computing cluster at which the user credentials file 605 will be enforced. The combination of the name of the user credentials file 605, and the name of the cluster "example-cs" at line 608 may form a single credential set in an embodiment. This credential set may then be stored within the credential sets file 631.

The KIRL cluster seeding and security system in an embodiment may then output the list of credential sets within the stored credential sets file 631. In such a way, the KIRL cluster seeding and security system in an embodiment may identify a plurality of stored cluster configuration files by which a specific cluster has been configured at one or more points in time. Further, by grouping by configuration context, the KIRL cluster seeding and security system may distinguish between two separate cluster configuration files by which a single cluster has been configured at two separate points in time, with each of the separate points in time associated with a separate configuration context. For example, cluster 610 may have been configured according to a first configuration context named "testing-cluster" at one point in time and configured according to a second configuration context named "development-cluster" at a second point in time. In some embodiments, the KIRL cluster seeding and security system in an embodiment may list stored credential sets by cluster, or may limit the output list of credential sets to those associated with a user-specified cluster. The KIRL cluster seeding and security system in such an embodiment may perform such a grouping or narrowing of output results by grouping all credential sets containing the user-specified cluster together, or by only including within the output credential sets containing the user-specified cluster. The method for initializing a KIRL root directory that may be used to list credential sets describing which users are authorized to configure specific clusters may then end.

At block 710, the KIRL cluster seeding and security system that has received a user instruction to add a new authorized user or credential set in an embodiment may receive a user credentials file and location of a cluster at which the user credentials file is or will be stored. For example, in an embodiment described with reference to FIG. 5, a user of the KIRL cluster seeding and security system 570 may use the add credential set instruction to provide a user credentials file 505 identifying and authenticating users authorized to configure a computing cluster (e.g., 510). For example, a user credentials file 505 may include an identification of the cluster (e.g., 510) undergoing configuration and define one or more users that are authorized to configure the cluster 510. The user credentials file 505 in an embodiment may also provide the name or location for certification of the identified user's machine 580 as the authorized user, and point to a client certificate 582 and a client key 583 stored in memory 581 at the user's machine 580.

In another embodiment, the user may employ the instruction to add a credential set in order to add a new user to the list of those previously authorized to configure a given cluster (e.g., 510). In such an embodiment, the user may need to edit the user credentials file 505 to identify the cluster the new user is authorized to configure, and identify the new user. In addition, the user may need to provide the name or location for certification of the new user's machine as the authorized user (e.g., by referencing a new client certificate), and point to a new client key associated with the newly authorized user. The user may provide such an edited user credentials file to the KIRL cluster seeding and security system in an embodiment via the KIRL user interface, for example. The user in such an embodiment may be a manger for one or more computer engineers authorized to configure the cluster.

The KIRL cluster seeding and security system in an embodiment may generate a credential set name combining the user credentials file name and the cluster at which the user credentials file is stored at block 712. For example, in an embodiment described with reference to FIG. 6, the KIRL cluster seeding and security system may access the user credentials file 605 to identify the name of the user credentials file 605, and may identify, at line 608, the name "example-cs" of a computing cluster at which the user credentials file 605 will be enforced. The combination of the name of the user credentials file 605, and the name of the cluster "example-cs" at line 608 may form a single credential set, which may then be stored within the credential sets file 631 in an embodiment. Future reference to this credential set name in an embodiment may allow the KIRL cluster seeding and security system to quickly determine when an unauthorized reconfiguration of the cluster has occurred, as described in greater detail with respect to FIG. 8. The flow may then proceed to block 718 for transmission of the received user credentials file to the master node at the cluster.

Returning to block 706, a user instruction to remove a credential set may be received, and the method may proceed to block 714. At block 714, in an embodiment in which the KIRL cluster seeding and security system has received a user instruction to remove or replace a credential set or an authorized user may remove from the KIRL root directory the credential set name associated with the user credentials file authorizing the removed user to configure a cluster. For example, in an embodiment described with reference to FIG. 5, a user may instruct the KIRL cluster seeding and security system 570 to remove the user "example-user-1" 580 from the user credentials file 505. This may be achieved by the user submitting an updated user credentials file that removes lines 508 and 509, or replaces these lines with an identification of another user, client certificate, or client key.

Upon receipt of such an updated user credentials file, the KIRL cluster seeding and security system may identify any credential sets stored within the credential set file in the KIRL root directory that include reference to the original user credentials file that has been updated. For example, as described with reference to FIG. 6, the credential set file 631 in an embodiment may contain several credential sets, with each identifying the name of a cluster to be configured and the name of the user credentials set file identifying users authorized to perform such a configuration. In an embodiment in which the original user credentials file and updated user credentials file share the same name, the KIRL root directory may automatically remove any credential sets identifying the shared user credentials file name and repopulate the credential sets file 631 with credential sets created based solely on the updated user credentials file (e.g., following the same process described with reference to the original user credentials file above at block 712). In such a way, the KIRL root directory may store up to date information identifying which users are authorized to configure each of the clusters identified within the KIRL root directory. Future reference to these credential sets in an embodiment may allow the KIRL cluster seeding and security system to quickly determine when an unauthorized reconfiguration of the cluster has occurred, as described in greater detail with respect to FIG. 8. The method may then proceed to block 718 for transmission of the updated user credentials file to the master node for the cluster identified in the updated user credentials file.

Returning to block 706, a user instruction to adjust encryption for a credential set may be received, and the method may proceed to block 716. The KIRL cluster seeding and security system may encrypt, decrypt, or rotate the encryption key used to encrypt the credential sets file at block 716. For example, the credential sets file 631 may be encrypted by the KIRL cluster seeding and security system by default, unless a user instruction to decrypt the credential sets file is received at block 716. The type of encryption and encryption key used to encrypt the credential sets file 631 in such an embodiment may be stored in the KIRL log configuration 633. Thus, upon rotation of the encryption method or key at block 716, the KIRL cluster seeding and security system in such an embodiment may edit the KIRL log configuration 633 to reflect the current encryption method and key for the credential set file 631. The method may then proceed to block 718 for transmission of the updated user credentials file to the master node for the cluster identified in the updated user credentials file.

At block 718, the KIRL cluster seeding and security system in an embodiment may transmit the initial or updated user credentials file to the master node at the cluster identified in the initial or updated user credentials file. For example, in an embodiment described with reference to FIG. 5, the KIRL cluster seeding and security system in such an embodiment may then transmit the user credentials file 505 or an updated version thereof (as described above with reference to block 710) to the master node 520, for storage at etcd storage 523. Prior to configuring the cluster 510 according to such an initial or updated configuration file received from the KIRL cluster seeding and security system, the master node 520 may retrieve the client certificate 582 and client key 583 from the user's machine 580, and determine, based on the retrieved client certificate 582 and client key 583 that the user 580 is indeed authorized to configure cluster 510. Similarly, prior to configuring the cluster 510 according to such an updated configuration file received from the KIRL cluster seeding and security system, the master node 520 may retrieve the new client certificate and new client key referenced in the updated configuration file and determine, based on the retrieved new client certificate and new client key that the new authorized user is indeed authorized to configure cluster 510. The method for initializing a KIRL root directory that may be used to add, remove, or adjust encryption for credential sets describing which users are authorized to configure specific clusters may then end. In such a way, the KIRL cluster seeding and security system in an embodiment may identify a plurality of stored cluster configuration files by which a specific cluster has been configured at one or more points in time. Further, tracking of credential sets as described herein may allow the KIRL cluster seeding and security system to quickly determine when an unauthorized reconfiguration of the cluster has occurred, as described in greater detail with respect to FIG. 8.

Figure 8:
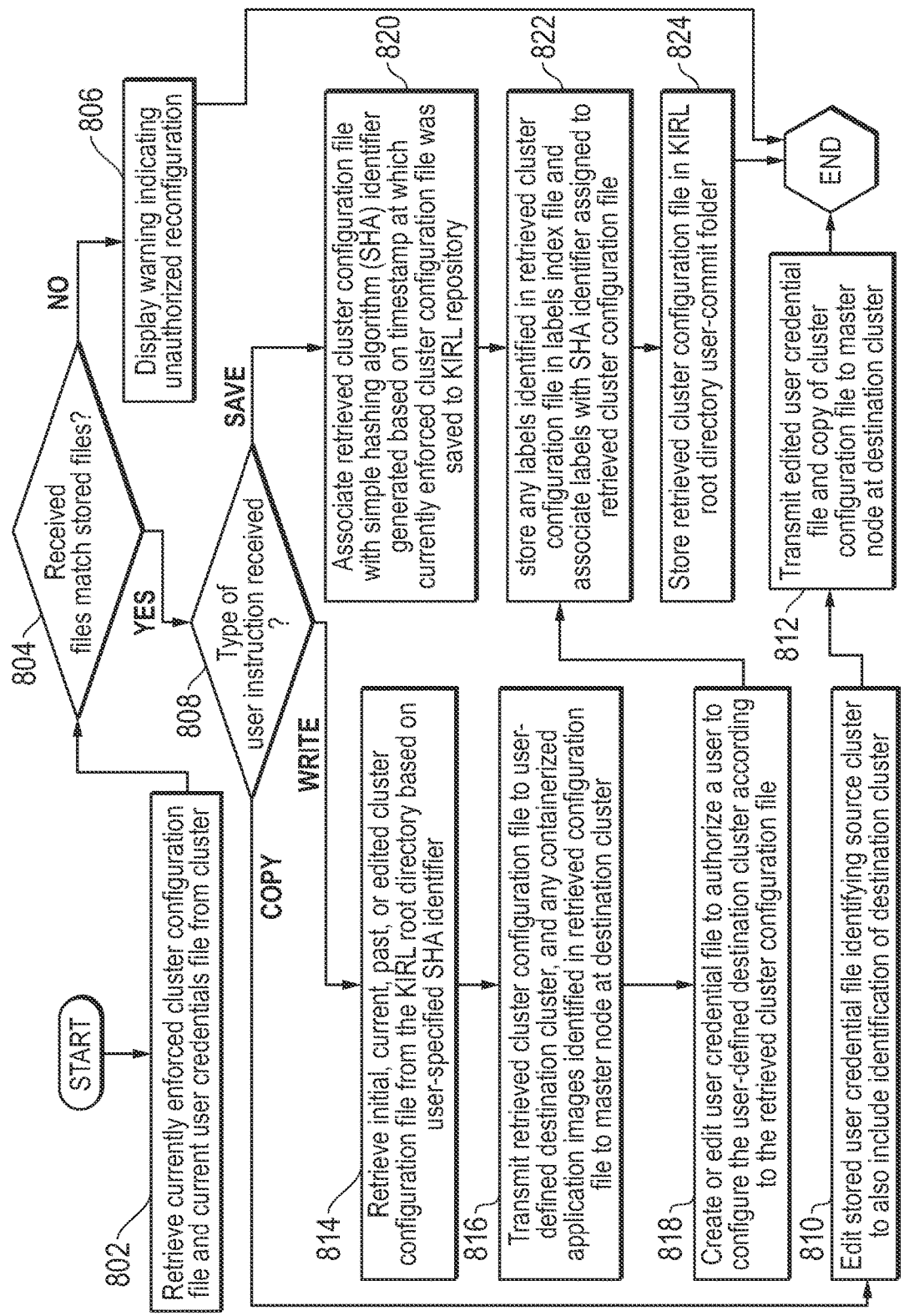
FIG. 8 is a flow diagram illustrating a method of duplicating or editing configuration of a computing cluster according to an embodiment of the present disclosure.

FIG. 8 is a flow diagram illustrating a method of duplicating a cluster configuration across a plurality of computing clusters, pods, or nodes, or editing configuration of a computing cluster according to an embodiment of the present disclosure. As described herein, existing container-orchestration systems facilitate creation, updating or editing, transmission, and enforcement of cluster configuration files and user credentials files, and can be used to identify the way in which a given cluster is supposed to be configured according to these files. However, these container-orchestration systems do not provide an ability to determine the actual configuration of such a cluster, or to track the ways in which such configurations have changed over time or between multiple pods, nodes, or clusters. The KIRL cluster seeding and security system in an embodiment may identify when changes are made to the configuration of a computing cluster executing a containerized software application, notify an authorized user or authorized computing engineers of an unauthorized reconfiguration, and track and compare those changes over time.

As part of this process, the KIRL cluster seeding and security system may store several versions of cluster configuration files enforced at various clusters over time within the structured KIRL root directory. Further, authorized users for each of the clusters may be tracked within the structured KIRL root directory, allowing for the addition and removal of authorized users, as well as associations between authorized users and each of the stored cluster configuration files in accordance with FIG. 7. This may allow the KIRL cluster seeding and security system to identify which user performed a specific change to a cluster configuration file, resulting in performance of one cluster, pod, or node that is inconsistent with performance at another cluster, pod, or node.

At block 802, the KIRL cluster seeding and security system may retrieve a currently enforced cluster configuration file and current user credentials file from a user-identified cluster. For example, in an embodiment described with reference to FIG. 6, the KIRL cluster seeding and security system may retrieve the third configuration file 611 from storage at the cluster 610, and store a copy 644 within the cluster configuration files folder 641 for the cluster 610 in the KIRL root directory 620. This retrieval and copying of cluster configuration files in an embodiment may be performed routinely or according to a preset schedule. The user may identify the cluster for routine monitoring in an embodiment by instructing the KIRL cluster seeding and security system to routinely scan a specific cluster within a cron job, or to scan all clusters identified within credential sets stored at the KIRL root directory, for example.

The KIRL cluster seeding and security system in an embodiment may determine at block 804 whether the files received at block 802 match corresponding files previously stored within the KIRL root directory. For example, the KIRL cluster seeding and security system may determine whether the newly stored third cluster configuration file 644 matches the previously stored first or second cluster configuration files (e.g., 642 or 643) in the KIRL root directory 620. The KIRL cluster seeding and security system in an embodiment may perform such a comparison using a source code management tool. For example, in an embodiment described with reference to FIG. 2, the source code management tool 271 of the KIRL cluster seeding and security system 270 may compare files, and track changes made between them. An example of such a source code management tool 271 in an embodiment may include the open-source version control system Git®. If the currently enforced cluster configuration file or current user credentials file received from the cluster at block 802 does not match the corresponding files stored at the KIRL root directory, this may indicate an outside or unauthorized party has manually reconfigured the cluster, and the method may proceed to block 806 to inform a user that is authorized to configure the cluster. If the currently enforced cluster configuration file and current user credentials file received from the cluster matches the corresponding files stored at the KIRL root directory, this may indicate the cluster was most recently configured by an authorized user via the KIRL cluster seeding and security system, and the method may proceed to block 808 to determine whether further user instruction regarding configuration files for the cluster have been received.

At block 806, in an embodiment in which the currently enforced cluster configuration file or current user credentials file received from the cluster at block 802 does not match the corresponding files stored at the KIRL root directory, the KIRL cluster seeding and security system may display a warning indicating to an authorized user that an unauthorized reconfiguration of the cluster has occurred. For example, in an embodiment described with reference to FIG. 1, the KIRL cluster seeding and security system 170 may display such a warning via the display device 110. No further actions may need to be taken by the KIRL cluster seeding and security system with regard to the retrieved cluster configuration file or user credentials file since they were generated by an unauthorized user. Thus, the method may then end.

In an embodiment in which the currently enforced cluster configuration file and current user credentials file received from the cluster at block 802 match the corresponding files stored at the KIRL root directory, the KIRL cluster seeding and security system may determine at block 808 whether it has received any user instructions for processing of the received cluster configuration file or other user-identified cluster configuration files. For example, the user may provide user instructions to copy a known configuration from one cluster to another cluster in an embodiment. As another example, the user may provide user instructions to write an initial or updated cluster configuration file to the KIRL root directory and to configure an identified cluster according to that initial or updated cluster configuration file. As yet another example, the user may provide user instructions to save an initial, or updated cluster configuration file to the KIRL root directory in an embodiment. In an embodiment described with respect to FIG. 2, for example, these user instructions may be received from the user via the KIRL user interface 273. In an embodiment in which a user instruction to copy a cluster configuration is received, the method may proceed to block 810 for editing of the stored user credential file identifying the cluster to be cloned. In an embodiment in which a user instruction to write a cluster configuration is received, the method may proceed to block 814 to retrieve a cluster configuration file instructing deployment of that cluster configuration from the KIRL root directory. In an embodiment in which a user instruction to save a cluster configuration is received, the method may proceed to block 820 for association of the cluster configuration file retrieved at block 802 with a simple hashing algorithm identifier within the KIRL root directory.

At block 810, in an embodiment in which a user instruction to copy a cluster configuration from cluster to another is received, the KIRL cluster seeding and security system may edit a stored user credential file identifying the source cluster (e.g., cluster to be cloned) to also include an identification of a destination cluster (e.g., executing the clone of the source cluster). As described herein, a cluster may be configured by a master node of the cluster configuring one or more minion nodes and pods to execute a containerized software application according to a received cluster configuration file. Because each master node can only store one cluster configuration file at a time, there is no need to identify the cluster within the cluster configuration file. As such, no editing of the cluster configuration file may be needed in order to configure a second cluster in the same fashion. Rather, the KIRL cluster seeding and security system may simply transmit the same cluster configuration file stored at the first cluster to the master node of the second cluster. This ability to run the same immutable and unchangeable containerized software applications across multiple nodes without adjusting the underlying code instructions of the containerized software applications is one of the benefits of containerized software applications.

In order to complete configuration of the second cluster, or destination cluster in an embodiment, the KIRL cluster seeding and security system may also transmit a user credentials file identifying user authorized to configure this second or destination cluster to master node for that cluster. This user credentials file may be almost identical to the user credentials file stored at the source cluster, if the same users are authorized to configure both clusters. In such a scenario, the KIRL cluster seeding and security system may retrieve the user credentials file identifying the source cluster from the KIRL root directory and edit this file to also identify and authorize configuration of the destination cluster. For example, in an embodiment described with reference to FIG. 6, the KIRL cluster seeding and security system may retrieve the user credentials file 605 and edit this file to include the name of the destination cluster (e.g., newly cloned cluster) within the cluster section (e.g., just below line 608). This name of the destination cluster may also be added within the configuration context of this file 605 (e.g., just below line 609).

The KIRL cluster seeding and security system in an embodiment may transmit the edited user credential file and a copy of the cluster configuration file configuring the source cluster to the master node at the destination cluster at block 812. The master node at the destination cluster may then refer to the edited or updated user credential file that includes the name of the destination cluster prior to configuring the destination cluster according to the received copy of the cluster configuration file. In such a way, the KIRL cluster seeding and security system in an embodiment may authorize the users identified within the user credentials file 605 to configure the destination cluster, in addition to the source cluster identified at line 608. Further, a new user-commit instruction folder identifying the destination cluster may also be created, and the copy of the cluster configuration file may be stored therein. The method may then end.

At block 814, in an embodiment in which a user instruction to write a cluster configuration is received, the KIRL cluster seeding and security system may retrieve an initial, current, past, or edited cluster configuration file from the KIRL root directory. For example, in an embodiment described with reference to FIG. 2, a user of the KIRL cluster seeding and security system 270 in an embodiment may create or edit a cluster configuration file for configuring a cluster 210 to execute one or more containerized software applications via the KIRL user interface 273. A user may utilize the "write" command to instruct a master node to configure one or more clusters according to an initial cluster configuration file if the cluster has never been previously configured, according to an edited or updated cluster configuration file received via the KIRL user interface if the cluster is to be reconfigured, or according to a previously applied cluster configuration file in order to restore an earlier configuration that has since been changed. The user may specify which of these cluster configuration files to retrieve at block 814 using a SHA identifier associated with that cluster configuration file at the time the cluster configuration file was received via the KIRL user interface, or retrieved from the currently-enforced, scanned cluster at block 802.

The KIRL cluster seeding and security system in an embodiment may transmit the cluster configuration file retrieved at block 814 to a user-defined destination cluster, and any containerized application images identified in the retrieved configuration file to the master node at the destination cluster at block 816. The KIRL cluster seeding and security system 270 may also retrieve an immutable or unchangeable container for one or more containerized software applications the cluster 210 will be configured to execute from an application image storage location 201, or from the KIRL user interface 273. For example, the KIRL cluster seeding and security system 270 may receive an image of a first application container 241, or a second application container 242. The KIRL cluster seeding and security system 270 in an embodiment may also store the images of these containerized software applications (e.g., 241 and 242) within the KIRL root directory 272. The KIRL cluster seeding and security system 270 may then transmit to a master node 220 operating within the computing cluster 210 the cluster configuration file for configuring cluster 210 to execute the containerized applications (e.g., 241 or 242), and one or more images of the containerized software applications (e.g., 241 or 242) to the cluster 210.

At block 818, the KIRL cluster seeding and security system in an embodiment may create or edit an existing user credential file authorizing a user to configure the user-defined destination cluster according to the cluster configuration file retrieved at block 814. For example, in an embodiment described with reference to FIG. 2, a user of the KIRL cluster seeding and security system 270 in an embodiment may create or edit a user credentials file identifying one or more users authorized to configure the cluster 210, via a KIRL user interface 273. The KIRL cluster seeding and security system 270 may then transmit to a master node 220 operating within the computing cluster 210 the user credentials file providing user credentials sufficient to authorize configuration of the cluster 210 according to the transmitted cluster configuration file. The method may then proceed to block 822 for storage of user-specified code editing labels identified in the retrieved cluster configuration file within the KIRL root directory.

In an embodiment in which a user instruction to save a retrieved cluster configuration currently enforced at a scanned cluster is received at block 808, the KIRL cluster seeding and security system at block 820 may associate the cluster configuration file retrieved at block 802 with a simple hashing algorithm identifier within the KIRL root directory. For example, in an embodiment described with reference to FIG. 6, storage of such retrieved copies of currently enforced configuration files at a cluster (e.g., 610), the KIRL cluster seeding and security system may generate a SHA identifier based on a timestamp identifying the time of such storage of the copy (e.g., 644) within the cluster configuration files 641, and may proceed to block 822.

At block 822, the KIRL cluster seeding and security system in an embodiment may store any labels identified in cluster configuration files retrieved from scanned clusters at block 802 or received via the KIRL user interface and retrieved at block 814 within a labels index file of the KIRL root directory. For example, in an embodiment described with reference to FIG. 4, a user may edit an initial configuration file to add a user-specified code editing label 406 within the edited cluster configuration file 405, providing notation about the code editing process for configuration files configuring cluster 410. More specifically, such a user-specified code editing label may note the project (e.g., entitled "example") under which the cluster 410 was configured according to the edited cluster configuration file 405, or the stage of development, testing, or deployment at which the edited cluster configuration file 405 was created and instituted to configure cluster 410.

As another example, in an embodiment described with reference to FIG. 6, the KIRL cluster seeding and security system may identify one or more such user-specified code editing labels within a received and stored configuration file or copy thereof (e.g., 642, 643, or 644). The user-specified code editing labels so identified may then be stored within the labels index folder 632, along with the SHA identifier associated with the copy (e.g., 642, 643, or 644) of the configuration file in which the label was identified. Such an association within the labels index 632 may facilitate a user search for the identified label across a plurality of cluster configuration files stored within the cluster configurations folder 641, as described in greater detail with respect to FIG. 9, below.

The KIRL cluster seeding and security system in an embodiment may store the cluster configuration file retrieved from scanned clusters at block 802 or received via the KIRL user interface and retrieved at block 814 in the KIRL root directory, within a user-commit instruction folder. For example, in an embodiment described with reference to FIG. 6, the KIRL cluster seeding and may refer to the name of the cluster identified at line 608 of the user credentials file 605 in order to create a folder for storage of various configuration files enforced at the cluster identified at line 608. More specifically, the KIRL cluster seeding and security system in such an embodiment may name such a folder by combining the name of the cluster (e.g., "example-cs") found at line 608 with the name of the configuration context (e.g., "development-cluster") given at line 609 of the user credentials file 605, to give the folder name "example-cs-development-cluster" 640. The KIRL cluster seeding and security system in such an embodiment may then store a copy 642 of the first configuration file 606 or a copy 643 of the second configuration file 607 in the folder "example-cs-development-cluster" 640 within a folder of cluster configuration files 641. The KIRL cluster seeding and security system in such an embodiment may also store a copy 644 of a currently enforced cluster configuration file 611 retrieved from the cluster 610 (e.g., as described with reference to block 802) within the cluster configuration files 641. The copied and stored, currently enforced configuration file (e.g., 644) may then be compared against the files (e.g., 605 and 607) most recently transmitted by the KIRL cluster seeding and security system to the cluster 610, in order to determine whether an outside agent or unauthorized user has manually modified the cluster configuration, as described with reference to blocks 804 and 806 above. Additionally, the cluster configuration files 605 and 606, both received via the KIRL user interface from an authorized user may be compared against one another in order to track changes made throughout the evolution of deployment for the containerized software application at multiple clusters or nodes. In such a way, the KIRL cluster seeding and security system in an embodiment may alert an authorized user or manager of authorized users that an unauthorized reconfiguration of a cluster has occurred, store all changes in the structured KIRL root directory describing the context of those changes, and correlate changes to cluster configuration files with user-specified labels. The structured storage within the KIRL root directory and correlation with user-specified labels so described may allow for tracking and comparison of changes made between various cluster configuration files over time and between distinct clusters, as described with respect to FIG. 9. The method may then end.

Figure 9:
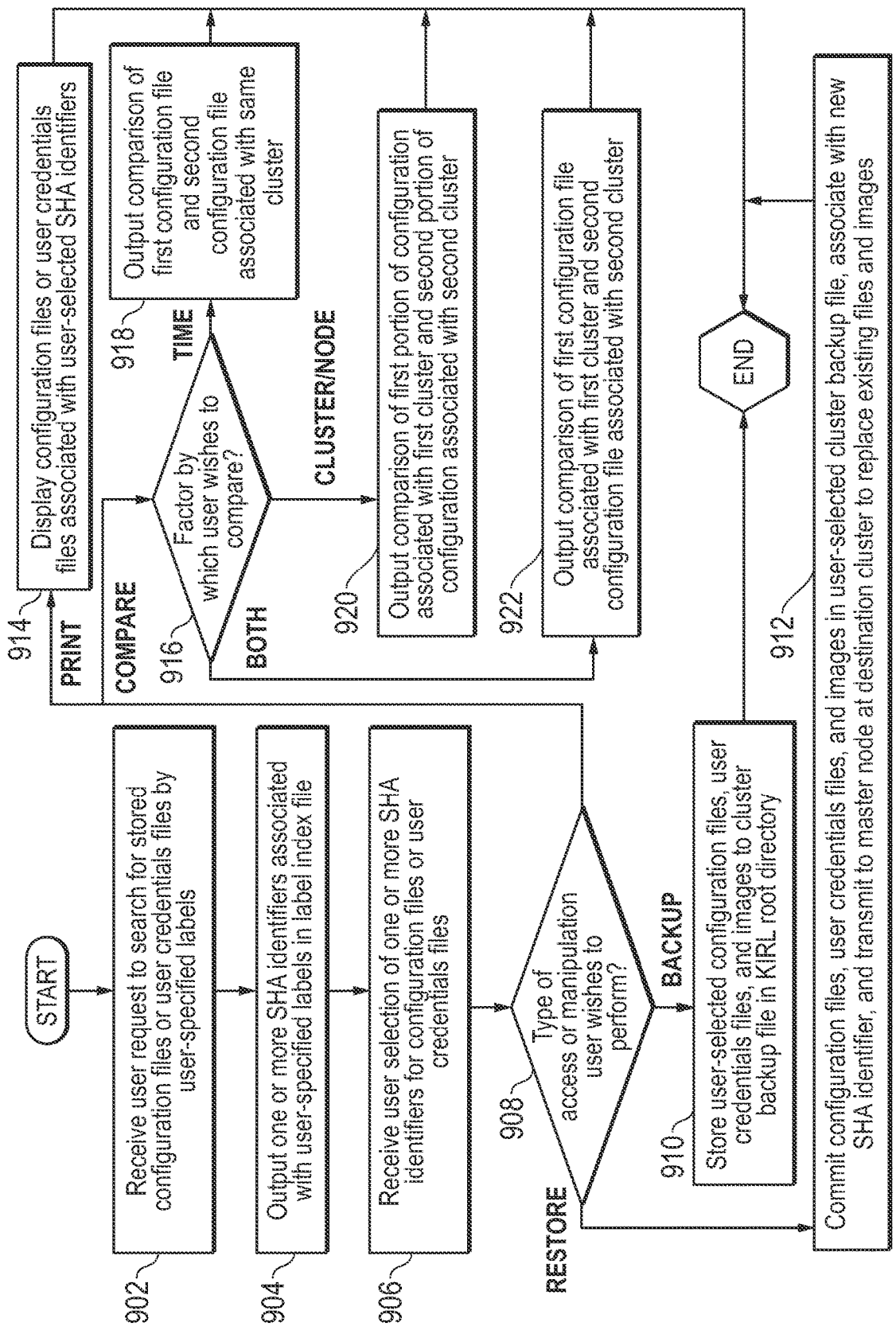
FIG. 9 is a flow diagram illustrating a method of searching across user-specified code editing labels to identify cluster configuration files according to an embodiment of the present disclosure.

FIG. 9 is a flow diagram illustrating a method of applying user-specified code editing labels and searching across user-specified code editing labels to identify cluster configuration files containing those labels according to an embodiment of the present disclosure. As described herein, the KIRL cluster seeding and security system in an embodiment may allow computing engineers to view and navigate the ways in which different computing clusters have been configured over time. For example, a computing engineer may use the KIRL cluster seeding and security system in an embodiment to determine why a first computing cluster, configured in a first fashion is outperforming or underperforming a second computing cluster, configured in a second fashion. As another example, a computing engineer may use the KIRL cluster seeding and security system in an embodiment to determine why performance of a given computing cluster has fluctuated (e.g., increased or decreased) at various points in time at which the cluster was reconfigured. Computing engineers may thus use the KIRL cluster seeding and security system to correlate performance of computing clusters with various configurations for execution of a containerized software application.

As also described herein, an association made between user-specified code editing labels and SHA identifiers for cluster configuration files containing those labels may be stored within the labels index of a KIRL root directory. Such an association may facilitate a user search for the identified label across a plurality of cluster configuration files stored within the cluster configurations folder of the KIRL root directory.

At block 902, the KIRL cluster seeding and security system in an embodiment may receive a user request to search for stored cluster configuration files by user-specified labels. For example, in an embodiment described with reference to FIG. 2, a user may identify the user-specified label and request a list of all cluster configuration files containing that label via the KIRL user interface 273. As described in an embodiment with reference to FIG. 4, a user in may add a user-specified code editing label 406 within the edited cluster configuration file 405. In such an embodiment, the user-specified code editing label 406 may provide notation about the code editing process for configuration files configuring cluster 410, rather than any actionable code instructions relied upon by the master node 420 to configure cluster 410. For example, such a user-specified code editing label may note the project (e.g., entitled "example") under which the cluster 410 was configured according to the edited cluster configuration file 405. As another example, such a user-specified code editing label may note the stage of development, testing, or deployment at which the edited cluster configuration file 405 was created and instituted to configure cluster 410.

These user-specified code editing labels (e.g., 406) in an embodiment may differ from "tags" made available via existing container-orchestration systems, in that the same user-specified code editing label (e.g., 406) may be applied to multiple configuration files, while traditional "tags" may only be applied to a single configuration file. Existing container-orchestration systems may store only the most recently committed or enforced cluster configuration files, while the KIRL cluster seeding and security system stores a plurality of configuration files, and tracks the clusters or nodes at which they were enforced, and the time period during which they were enforced at those clusters or nodes. Further, the KIRL cluster seeding and security system may maintain a log correlating any user-specified code labels written into a cluster configuration file with an identification of that cluster configuration file. Users may search across "tags" or user-specified code editing labels in order to find configuration files incorporating such tags or labels. For example, in existing container-orchestration systems, a user may search for the tag "testing," and the container-orchestration system may return only the latest configuration file (e.g., most recently transmitted to a master node for enforcement) incorporating the tag "testing." In contrast, a user of the KIRL cluster seeding and security system in an embodiment may search for the label "example," and retrieve all of the several configuration files written under the project "example," by referencing the log correlating the label "example" and one or more cluster configuration files identifiers. This may allow the KIRL cluster seeding and security system user to analyze evolution of the cluster configuration throughout the "example" project, for example.

The KIRL cluster seeding and security system in an embodiment may output one or more SHA identifiers associated with the user-specified labels within the label index file of the KIRL root directory at block 904. As described herein with reference to block 822 of FIG. 8, the KIRL cluster seeding and security system in an embodiment may store any labels identified within a cluster configuration file stored at the KIRL root directory in a labels index file and associate those labels with a SHA identifier assigned to the cluster configuration file. Upon receiving the instruction to search for cluster configuration files containing the user-specified code editing label received via the KIRL user interface at block 902, the KIRL cluster seeding and security system may identify one or more SHA identifiers associated with the user-specified code editing label within the label index file in the KIRL root directory. The KIRL cluster seeding and security system may output or display to the user the list of SHA identifiers so identified. In some embodiments the list of SHA identifiers output or displayed to the user in such a manner may be narrowed or limited according to additional received user instructions. For example, a user may provide a user instruction to display only the cluster configuration file matching the user-specified code editing label that was most recently stored within the KIRL root directory. As another example, a user may provide a user instruction to display only the cluster configuration files matching a plurality of user-specified code editing labels, or only the cluster configuration file matching a plurality of user-specified code editing labels that was most recently stored within the KIRL root directory. As yet another example, a user may provide a user instruction to display only the cluster configuration file matching a plurality of user-specified code editing labels that was stored within the KIRL root directory first.

In yet another example, a user may provide a user instruction to display cluster configuration files containing a user-specified code editing label indicating cluster performance metrics within a specified range, or a closest match to a defined value. For example, as described with reference to FIG. 4, a user-specified code editing label may include a notation recording one or more performance metrics (e.g., CPU consumption rate, latency, throughput, etc.) for one or more clusters executing the containerized software application(s) according to the configuration file 405 during a preset time period (e.g., over a month long period specified within the user-specified code editing label). In such an example embodiment, the user may provide a user instruction to display cluster configuration files containing a user-specified code editing label including a specific month (e.g., April), a specific performance metric (e.g., latency, dropped packets, etc), and a specific value (e.g., 40%).

At block 906, the KIRL cluster seeding and security system may receive a user selection of one or more SHA identifiers for cluster configuration files or user credentials files. For example, the user may perform such a selection by selecting only one of the SHA identifiers output by the KIRL cluster seeding and security system at block 904. As another example, the user may directly input the SHA identifier for a cluster configuration file via the KIRL user interface, without the need for a search across user-specified code editing labels. Once a user has chosen such a SHA identifier for a given cluster configuration file, that cluster configuration file may be referred to herein as a user-selected cluster configuration file. As described in greater detail directly below a user may also choose to perform some type of access or manipulation on such a user-selected cluster configuration file in an embodiment.

The KIRL cluster seeding and security system in an embodiment may determine which user instruction type for manipulation of user-selected cluster configuration files has been received at block 908. For example, the user may provide an instruction to restore a cluster to a previous applied configuration according to the user-selected cluster configuration file, to backup a copy of the user-selected cluster configuration file, user credentials set, and associated images, to print the user-selected cluster configuration file and associated user credentials, or to compare two different cluster configuration files (e.g., including the user-selected cluster configuration file) or user credentials files. In an embodiment in which the KIRL cluster seeding and security system receives a user instruction to backup the user-selected cluster configuration file, the method may proceed to block 910 for storage of the user-selected files within the KIRL root directory as the current backup. In an embodiment in which the KIRL cluster seeding and security system receives a user instruction to restore a previous configuration of a cluster according to the user-specified cluster configuration file, the method may proceed to block 912 for transmission of the user-specified cluster configuration file to the cluster for current enforcement. In an embodiment in which the KIRL cluster seeding and security system receives a user instruction to print the user-selected cluster configuration files, the method may proceed to block 914 to display the user-selected cluster configuration files or user credentials files associated therewith. In an embodiment in which the KIRL cluster seeding and security system receives a user instruction to compare user-selected cluster configuration files, the method may proceed to block 916 to determine a method by which the user wishes to compare such cluster configuration files.

At block 910, in an embodiment in which the KIRL cluster seeding and security system receives a user instruction to backup the user-selected cluster configuration file, the KIRL cluster seeding and security system may store the user-selected configuration files, associated user credentials files, and associated images to a cluster backup file in the KIRL root directory. For example, in an embodiment described with reference to FIG. 6, the KIRL root directory 620 may store a cluster backup file 634 containing a copy of a configuration file for one or more clusters. The cluster backup file 634 may represent the configuration file (e.g., 611 or copy 644) most recently determined to be currently enforced at the cluster 610, which may not be the same as the latest configuration file (e.g., 607 or copy 643) most recently received via the KIRL user interface 673 in an embodiment. This may occur, for example, if the cluster 610 was reverted back to an earlier version of a cluster configuration file, of if the cluster 610 was most recently configured without using the KIRL user interface 673 (e.g., circumventing the KIRL cluster seeding and security system). By storing the user-selected cluster configuration file as the cluster backup file, the KIRL cluster seeding and security system may allow the user to identify one of a plurality of previously stored cluster configuration files (e.g., not the most recently received via the KIRL user interface) as the currently enforced cluster configuration file. The method for manipulating cluster configuration files containing user-specified code editing labels may then end.

In an embodiment in which the KIRL cluster seeding and security system receives a user instruction to restore a previous configuration of a cluster according to the user-specified cluster configuration file at block 908, the KIRL cluster seeding and security system may commit configuration files, and associated user credentials files for transmission to the master node of a destination cluster at block 912. The KIRL cluster seeding and security system may interpret the instruction to restore the user-specified cluster configuration file (as identified by the user-selected SHA identifier) as a user-commit instruction. Such a user-commit instruction may comprise a timestamped confirmation of a user instruction to configure a computing cluster according to the user-selected backup cluster configuration file stored in the KIRL root directory. For example, in an embodiment described with reference to FIG. 6, the KIRL cluster seeding and security system may respond to a user instruction to commit a user-selected backup cluster configuration file by storing a copy of the backup configuration file 634 within the cluster configuration files 641, and generating a simple hashing algorithm (SHA) identifier based on a timestamp identifying the time of such storage of the backup 634 within the cluster configuration files 641. The KIRL cluster seeding and security system in such an embodiment may further transmit the backup cluster configuration file 634 and any associated images of the containerized software application referenced in the backup configuration file 634 to the cluster the user wishes to backup in such a manner. The cluster may then enforce the backup configuration file 634 and execute the containerized software application within the associated images according to the backup configuration file 634. In such a way, the KIRL cluster seeding and security system may allow a computing engineer or authorized user to revert a cluster to a configuration dictated by a previously stored cluster configuration file. This may be the case since the KIRL root directory stores and tracks each of a plurality of cluster configuration files enforced at various clusters over a period of time. In other words, the computing engineer or authorized user may use this method to select a cluster configuration file from a plurality of cluster configuration files currently or previously enforced across a plurality of clusters, and configure one of the plurality of clusters or a new cluster according to the user-selected cluster configuration file. The method for manipulating cluster configuration files containing user-specified code editing labels may then end.

At block 914, in an embodiment in which the KIRL cluster seeding and security system receives a user instruction to print the user-selected files, the KIRL cluster seeding and security system may display the cluster configuration files or user credentials file associated with the user-selected SHA identifiers. Some industries that employ cloud computing resources such as containerized software applications require auditing of performance, configuration, and security of computing clusters executing such containerized software applications. Using the print functionality, in combination with user selection of cluster configuration files (e.g., by user-specified label) as described above, the KIRL cluster seeding and security system in an embodiment may provide for quick reporting in compliance with such auditing requirements. For example, in an embodiment described with reference to FIG. 1, the KIRL cluster seeding and security system 170 may display these cluster configuration files or user credentials files via a display device 110. The method for manipulating cluster configuration files containing user-specified code editing labels may then end.

In an embodiment in which the KIRL cluster seeding and security system receives a user instruction to compare user-selected files, the KIRL cluster seeding and security system may determine a criteria by which the user wishes to compare multiple files at block 916. As described with reference to FIG. 6, the KIRL root directory 620 may store several cluster configuration files implemented across various clusters during different time periods. For example, the cluster configuration files folder 641 may contain a first cluster configuration file 606, and a second cluster configuration file 607. In some embodiments, the first cluster configuration file 606 and the second configuration file 607 may configure the same computing cluster (e.g., 610), with the first and second configuration files each configuring the cluster 610 at different points in time. In other embodiments, the first cluster configuration file 606 may configure a first computing cluster (e.g., 610), and the second cluster configuration file 607 may configure a second computing cluster. These first and second computing clusters in various embodiments may operate according to these configuration files at the same point in time, or at different points in time. Indicating the factor by which the user wishes to compare multiple cluster configuration files may identify the specific cluster configuration files the user wishes to compare. The user may provide this factor via the KIRL user interface in an embodiment.

In an embodiment in which the user wishes to compare configurations for the same cluster over time, the method may proceed to block 918 for comparison of two separate cluster configuration files implemented at different times to configure the same cluster. In an embodiment in which the user wishes to compare configurations for the different clusters or nodes within a single cluster operating at the same time, the method may proceed to block 920 for comparison of a portion of a cluster configuration file configuring the first cluster or node, and a second portion of the same cluster configuration file configuring the second cluster or node. In an embodiment in which the user wishes to compare configurations for two different clusters over time, the method may proceed to block 922 for comparison between a first cluster configuration file configuring a first cluster at a first point in time, and a second cluster configuration file configuring a second cluster at a second point in time.

At block 918, in an embodiment in which the user wishes to compare configurations for the same cluster over time, the KIRL cluster seeding and security system may output a comparison of a first configuration file and a second configuration file associated with the same cluster. For example, in an embodiment described with reference to FIG. 6, the KIRL root directory may store all cluster configuration files for configuring a single cluster (e.g., cluster "example-cs" 610) within a single user-commit instruction folder 640, and cluster configuration files folder 641. Upon receiving instruction from the user to compare configurations of the cluster "example-cs" 610 over time, the KIRL cluster seeding and security system in an embodiment may compare all cluster configuration files (e.g., 642, 643, and 644) stored within the cluster configuration files 641 associated with the cluster "example-CS" 610.

The KIRL cluster seeding and security system in an embodiment may thus allow computing engineers to view and navigate the ways in which different computing clusters have been configured over time. For example, in an embodiment described with reference to FIG. 3, the cluster 310 may be configured according to the initial cluster configuration file 305 directing execution of the containerized software application "nginx 1.14.2" at a first point in time. As another example, in an embodiment described with reference to FIG. 4, the same cluster (identified as 410) may be configured according to the edited cluster configuration file 405 directing execution of the containerized software application "nginx 1.15" at a second point in time. In other words, the same cluster may have performed better or worse when executing the version 1.14.2 of the nginx containerized software application than it did when executing the version 1.15 of the same containerized software application. A computing engineer may use the KIRL cluster seeding and security system in an embodiment to determine why performance of a given computing cluster has fluctuated (e.g., increased or decreased) at various points in time at which the cluster was reconfigured. This may allow the computing engineer to optimize further reconfigurations of that cluster (e.g., by deploying the better performing version of the containerized software application nginx). The method for manipulating cluster configuration files containing user-specified code editing labels may then end.

The KIRL cluster seeding and security system in an embodiment in which the user wishes to compare configurations for the different clusters operating at the same time may output a comparison of a first portion of a configuration associated with a first cluster and a second portion of a configuration associated with a second cluster within a single cluster configuration file at block 920. For example, as described with reference to FIG. 3, a single cluster configuration file (e.g., 305) in an embodiment may operate to configure a plurality of clusters, nodes, or pods. As described with reference to FIG. 2, the source code management tool 271 in an embodiment may operate to track any changes made between various cluster configuration files received via the KIRL user interface 273 (or stored at the KIRL root directory) in such a way. The KIRL cluster seeding and security system in an embodiment may retrieve the cluster configuration file associated with both of the clusters or nodes identified by the user most recently stored at the KIRL root directory. The source code management tool 271 may then track any changes made between the section of this retrieved cluster configuration file configuring the first cluster or node and the section of this retrieved cluster configuration file configuring the second cluster or node. The KIRL cluster seeding and security system may then output this comparison. In such a way, a computing engineer may use the KIRL cluster seeding and security system in an embodiment to determine why a first computing cluster, configured in a first fashion is outperforming or underperforming a second computing cluster, configured in a second fashion. The method for manipulating cluster configuration files containing user-specified code editing labels may then end.

At block 922, in an embodiment in which the user wishes to compare configurations for two different clusters over time may output a comparison of a first configuration file associated with the first cluster or node and a second configuration file associated with the second cluster or node. The user may specify a first SHA indicator for a specific cluster configuration file for the first cluster or node and a second SHA indicator for a specific cluster configuration file for the second cluster or node. The KIRL cluster seeding and security system in an embodiment may then retrieve the specifically identified cluster configuration files, and compare them against one another using the source code management tool 271. The KIRL cluster seeding and security system may display this comparison to the user. The KIRL cluster seeding and security system in an embodiment may thus allow computing engineers to view and navigate the ways in which different computing clusters have been configured over time, and to correlate performance of computing clusters with various configurations for execution of a containerized software application. The method for manipulating cluster configuration files containing user-specified code editing labels may then end.

The blocks of the flow diagrams of FIGS. 7-9 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system operating a Kubernetes® Immutable Resource Log (KIRL) cluster seeding and security system comprising:
   a processor, executing KIRL cluster seeding and security system code instructions to:
      receive, via user input, a first cluster configuration file configuring a computing cluster for execution of a containerized software application and a first user credentials file for the computing cluster, defining a user authorized via the KIRL cluster seeding and security system to deploy the containerized software application at the computing cluster;
      store in a KIRL root directory a first credential set identifying the computing cluster and identifying the first user credentials file for the computing cluster;
      store the first cluster configuration file within a user-commit instruction folder within the KIRL root directory;
   a network interface device configured to receive from the computing cluster a currently enforced cluster configuration file configuring the computing cluster for execution of a currently executing software application, and a current user credentials file for the computing cluster;
   the processor, executing KIRL cluster seeding and security system code instructions to:
      determine the first user credentials file identified in the first credential set associated with the containerized software application does not match the current user credentials file, or the first cluster configuration file does not match the currently enforced cluster configuration file for the currently executing software application; and
   a display device configured to display a warning message indicating an unauthorized reconfiguration of the computing cluster has occurred.

2. The information handling system of claim 1, wherein the network interface device is configured to routinely receive from the computing cluster updated cluster configuration files.

3. The information handling system of claim 1 further comprising:
the processor executing KIRL cluster seeding and security system code instructions to store the currently enforced cluster configuration file and an image of the currently executing software application in a cluster backup file of the KIRL root directory.

4. The information handling system of claim 1 further comprising:
the processor configured to receive a user instruction to save the first cluster configuration file, and generate a simple hashing algorithm (SHA) identifier based on a timestamp identifying the time of receipt of the user instruction to save; and
the processor executing KIRL cluster seeding and security system code instructions to store an association between a user-specified code editing label within the first cluster configuration file and SHA identifier in a label index of the KIRL root directory.

5. The information handling system of claim 1 further comprising:
the processor configured to receive a user instruction to write the first cluster configuration file to the computing cluster; and
the network interface device configured to transmit the first cluster configuration file to a master node of the computing cluster for configuring the computing cluster to execute the containerized software application.

6. The information handling system of claim 1 further comprising:
the processor configured to receive a user instruction to add a new authorized user;
the processor executing KIRL cluster seeding and security system code instructions to:
edit the first user credentials file to include an identification of the new authorized user, a location of a client certificate for the new authorized user, and a location of a client key for the new authorized user; and
the network interface device configured to transmit the edited first user credentials file to a master node of the computing cluster.

7. The information handling system of claim 1 further comprising:
the processor configured to receive a user instruction to remove the user;
the processor executing KIRL cluster seeding and security system code instructions to:
edit the first user credentials file to remove an identification of the user, a location of a client certificate for the user, and a location of a client key for the user; and
the network interface device configured to transmit the edited first user credentials file to a master node of the computing cluster.

8. A method of operating a Kubernetes® Immutable Resource Log (KIRL) cluster seeding and security system comprising:
receiving, via user input, a first cluster configuration file configuring a computing cluster for execution of a containerized software application and a first user credentials file for the computing cluster, defining a user authorized via the KIRL cluster seeding and security system to deploy the containerized software application at the computing cluster;
storing in a KIRL root directory in a memory a first credential set identifying the computing cluster and identifying the first user credentials file for the computing cluster and the first cluster configuration file;
receiving from the computing cluster at a network interface device a currently enforced cluster configuration file configuring the computing cluster for execution of a currently executing software application, and a current user credentials file for the computing cluster;
determining, via a processor, the first user credentials file identified in the first credential set associated with the containerized software application does not match the current user credentials file, or the first cluster configuration file does not match the currently enforced cluster configuration file for the currently executing software application; and
displaying, via a display device, a warning message indicating an unauthorized reconfiguration of the computing cluster has occurred.

9. The method of claim 8 further comprising:
routinely receiving from the computing cluster, at the network interface device, updated cluster configuration files.

10. The method of claim 8 further comprising:
storing the currently enforced cluster configuration file and an image of the currently executing software application in a cluster backup file of the KIRL root directory in memory.

11. The method of claim 8 further comprising:
receiving a user instruction at the processor to save the first cluster configuration file, and generate a simple hashing algorithm (SHA) identifier based on a timestamp identifying the time of receipt of the user instruction to save; and
storing an association between a user-specified code editing label within the first cluster configuration file and SHA identifier in a label index of the KIRL root directory in memory.

12. The method of claim 8 further comprising:
receiving a user instruction at the processor to write the first cluster configuration file to the computing cluster; and
transmitting, via the network interface device, to the first cluster configuration file to a master node of the computing cluster for configuring the computing cluster to execute the containerized software application.

13. The method of claim 8 further comprising:
receiving a user instruction to add a new authorized user;
editing, via the processor, the first user credentials file to include an identification of the new authorized user, a location of a client certificate for the new authorized user, and a location of a client key for the new authorized user; and
transmitting, via the network interface device, the edited first user credentials file to a master node of the computing cluster.

14. The method of claim 8 further comprising:
receiving a user instruction to remove the user;
editing, via the processor, the first user credentials file to remove an identification of the user, a location of a client certificate for the user, and a location of a client key for the user; and transmitting, via the network interface device, the edited first user credentials file to a master node of the computing cluster.

15. An information handling system operating a Kubernetes® Immutable Resource Log (KIRL) cluster seeding and security system comprising:
a processor to execute the KIRL cluster seeding and security system code instructions configured to:
receive, via user input, a first cluster configuration file containing a user-specified code editing label and configuring a first computing cluster for execution of a containerized software application, and a first user credentials file for the computing cluster, defining a user authorized via the KIRL cluster seeding and security system to deploy the containerized software application at the computing cluster;
store in memory an association, within a label index of a KIRL root directory, between the user-specified code editing label and a timestamped confirmation of user instruction to configure the first computing cluster according to the first cluster configuration file;
receive a user instruction to identify one or more cluster configuration files including a user-specified search term;
determine the user-specified search term is associated with the first configuration file in the label index;
retrieve the first configuration file from a user-commit instruction file in the KIRL root directory; and
a display device to display the first configuration file.

16. The information handling system of claim 15, wherein the user-specified code editing label indicates a stage of development or deployment of the containerized software application to the first computing cluster.

17. The information handling system of claim 15, wherein the user-specified code editing label identifies the containerized software application executing at the first computing cluster.

18. The information handling system of claim 15, wherein the user-specified code editing label identifies a project for deployment of the containerized software application at the first computing cluster.

19. The information handling system of claim 1 further comprising:
the processor configured to receive a user instruction to copy the first cluster configuration file to a second computing cluster;
the processor to execute the KIRL cluster seeding and security system code instructions configured to edit the first user credentials file to identify the second computing cluster; and
the network interface device configured to transmit the first cluster configuration file, the first user credentials file, and an image of the containerized software application to a master node of the computing cluster for configuring the second computing cluster to execute the containerized software application.

20. The information handling system of claim 1 further comprising:
the processor configured to receive a user instruction to restore the first cluster configuration file for configuring the first computing cluster; and
the network interface device configured to transmit the first cluster configuration file, the first user credentials file, and an image of the containerized software application to a master node of the first computing cluster for configuring the first computing cluster to execute the containerized software application according to the first cluster configuration file.

* * * * *